US012681147B2

(12) United States Patent
Schrey et al.

(10) Patent No.: US 12,681,147 B2
(45) Date of Patent: Jul. 14, 2026

(54) LASER MEASURING APPARATUS FOR MEASURING DISTANCES, METHOD FOR OPERATING A LASER MEASURING APPARATUS FOR MEASURING DISTANCES

(71) Applicant: Fraunhofer-Gesellschaft zur Foerderung der angewandten Forschung e.V., Munich (DE)

(72) Inventors: Olaf Schrey, Duisburg (DE); Andre Buchner, Duisburg (DE); Jan Haase, Duisburg (DE); Christian Nitta, Duisburg (DE); Moritz Essig, Duisburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1084 days.

(21) Appl. No.: 17/827,263

(22) Filed: May 27, 2022

(65) Prior Publication Data

US 2022/0381882 A1      Dec. 1, 2022

(30) Foreign Application Priority Data

May 28, 2021    (DE) ..................... 10 2021 205 484.6

(51) Int. Cl.
*G01S 7/48* (2006.01)
*G01S 7/481* (2006.01)
(Continued)

(52) U.S. Cl.
CPC .......... *G01S 7/4808* (2013.01); *G01S 7/4816* (2013.01); *G01S 7/4865* (2013.01); *G01S 17/10* (2013.01)

(58) Field of Classification Search
CPC ...... G01S 7/4863; G01S 7/4876; G01S 17/10; G01S 7/4865
See application file for complete search history.

(56) References Cited

U.S. PATENT DOCUMENTS

2018/0231646 A1* 8/2018 Schrey ................. G01S 7/4876
2019/0369248 A1* 12/2019 Beer ....................... G01S 17/10

FOREIGN PATENT DOCUMENTS

DE      102017202353 A1    8/2018
DE      102019202459 A1    8/2020
EP         2708913 A1    3/2014

OTHER PUBLICATIONS

Beer et.al., "Background Light Rejection in SPAD-Based LiDAR Sensors by Adaptive Photon Coincidence Detection" , Dec. 8, 2018 (Year: 2018).*

(Continued)

*Primary Examiner* — Yuqing Xiao
(74) *Attorney, Agent, or Firm* — Perkins Coie LLP; Michael A. Glenn

(57) ABSTRACT

A laser measuring apparatus for measuring distances is disclosed, including a pulse laser; a photon detection device with a group of detection units; an evaluation device; a time measuring device; and a control device, wherein the control device is configured such that a plurality of measurement cycles is performed during each of the measurement operations; that one of the laser pulses is emitted with the pulse laser at the beginning of each measurement cycle of the plurality of measurement cycles; that, by means of the time measuring device, during each measurement cycle, one of the time periods is measured for each of the coincidence signals being detected during the respective measurement cycle; that the time periods measured during several of the measurement cycles of one of the measurement operations by means of the time measuring device are used to generate the measurement value of the respective measurement operation; that an adjustment of a maximum value for an event number takes place that corresponds to the number of time periods that are used during one of the measurement cycles to generate the measurement value of the respective (Continued)

measurement operation, wherein several of the time periods measured previously by means of the time measuring device are used for the adjustment; and that after the adjustment of the maximum value, the coincidence time is adjusted in dependence on the maximum value and a measurement value of a background radiation determined by the control device.

11 Claims, 15 Drawing Sheets

(51) Int. Cl.
  *G01S 7/4865*      (2020.01)
  *G01S 17/10*      (2020.01)

(56)                References Cited

OTHER PUBLICATIONS

Abbas, Tarek Al, et al., "A CMOS SPAD Sensor With a Multi-Event Folded Flash Time-to-Digital Converter for Ultra-Fast Optical Transient Capture", IEEE Sensors Journal, vol. 18, No. 8, Apr. 2018, pp. 3163-3173.

Beer, Maik, et al., "SPAD-based 3D sensors for high ambient illumination", in 2016 12th Conference on Ph.D. Research in Microelectronics and Electronics (PRIME), pp. 1-4.

Seitz, Peter, et al., {Uploaded in 3 parts] "Single-Photon Imaging", Heidelberg; New York: Springer, 2011.

* cited by examiner

LASER MEASURING APPARATUS FOR MEASURING DISTANCES, METHOD FOR OPERATING A LASER MEASURING APPARATUS FOR MEASURING DISTANCES

CROSS-REFERENCE TO RELATED APPLICATIONS

This application claims priority from German Patent Application No. 10 2021 205 484.6, which was filed on May 28, 2021, and is incorporated herein in its entirety by reference.

The invention relates to a laser measuring apparatus for measuring distances. More specifically, the invention relates to a laser measuring apparatus, which operates based on a pulse propagation time method for detecting distances at high speed in a contactless manner. Here, the propagation time of a laser pulse emitted by an active radiation source and reflected by a target object is measured by detecting the residual intensity. This is also referred to as Light Detection and Ranging (LIDAR).

BACKGROUND OF THE INVENTION

In the direct method considered here, the propagation time of a laser pulse from emission via reflection at the target object to detection in the sensor is detected by means of an electronic time measuring device (e.g. time-to-digital converter, TDC). Here, time measurement is started with the emission of a short laser pulse and stopped with the reception of the reflected pulse [1]. Stopping the time measurement takes place with the first event detected by the sensor after the start. Ideally, the measured time corresponds to the light propagation time and can be directly converted into the distance between the laser measuring apparatus and the respective target object via d=ct/2.

Due to this procedure, a high intensity of background light can cause an event resulting from the background light to be detected pulse at the sensor before the arrival of the reflected laser, resulting in a false measurement. In order to be able to tolerate such false measurements as well as statistical variations, several of these time marks are usually first collected in a histogram, from which the actual light propagation time is subsequently determined using an algorithm. By appropriately attenuating the sensitivity of the sensor, the rate of background events and consequently the number of false measurements can be reduced to a tolerable level. However, lowering the sensitivity of the sensor also lowers the probability of detecting the reflected laser pulse, which makes reliable and precise measurement difficult, especially at long distances.

With increasing distance or increasing background intensity, the probability of detecting photons emitted by the background instead of the sought-for photons reflected by the target increases, resulting in a decrease in measurement accuracy. To increase the number of tolerable background photons and thus the background resistance, not only the arrival time of the first photon within a measurement cycle is detected and recorded [2], but also the arrival times of several photons. This makes it possible to detect the laser pulse despite the detection of a background photon and to correctly determine the propagation time or distance. Further developments of this method are known from documents [4] and [5].

SUMMARY

According to an embodiment, a laser measuring apparatus for measuring distances may have: a pulse laser for emitting laser pulses; a photon detection device with a group of detection units for detecting photons and for generating detection signals, wherein each of the detection units generates one of the detection signals if the respective detection unit detects one of the photons; an evaluation device for evaluating the detection signals and for outputting coincidence signals, wherein the evaluation device outputs one of the coincidence signals if a predeterminable coincidence depth is at least reached within a predeterminable coincidence time, wherein the coincidence depth indicates a number of those detection units that generate one of the detection signals within the respective coincidence time; a time measuring device for measuring time periods from emitting one of the laser pulses to outputting one of the coincidence signals by the evaluation device; and a control device for controlling successive measurement operations, wherein at each of the measurement operations a measurement value is generated for one of the distances, wherein the control device is configured such that a plurality of measurement cycles is performed during each of the measurement operations; that one of the laser pulses is emitted with the pulse laser at the beginning of each measurement cycle of the plurality of measurement cycles; that, by means of the time measuring device, during each measurement cycle of the plurality of measurement cycles one of the time periods is measured for each of the coincidence signals being detected during the respective measurement cycle; that the time periods measured during several of the measurement cycles of one of the measurement operations by means of the time measuring device are used to generate the measurement value of the respective measurement operation; that an adjustment of a maximum value for an event number takes place that corresponds to the number of time periods that are used during one of the measurement cycles to generate the measurement value of the respective measurement operation, wherein several of the time periods measured previously by means of the time measuring device are used for the adjustment; and that after the adjustment of the maximum value, the coincidence time is adjusted in dependence on the maximum value and a measurement value of a background radiation determined by the control device.

According embodiment may have a method for operating a laser measuring apparatus for measuring distances, wherein the laser measuring apparatus may have: a pulse laser for emitting laser pulses, a photon detection device with a group of detection units for detecting photons and for generating detection signals, wherein each of the detection units generates one of the detection signals if the respective detection unit detects one of the photons; an evaluation device for evaluating the detection signals and for outputting coincidence signals, wherein the evaluation device outputs one of the coincidence signals if a predeterminable coincidence depth is at least reached within a predeterminable coincidence time, wherein the coincidence depth indicates a number of those detection units that generate one of the detection signals within the respective coincidence time; a time measuring device for measuring time periods from emitting one of the laser pulses to outputting one of the coincidence signals by the evaluation device; and a control device for controlling successive measurement operations, wherein at each of the measurement operations a measurement value is generated for one of the distances, wherein, controlled by the control device, a plurality of measurement cycles is performed during each of the measurement operations; wherein, controlled by the control device, one of the laser pulses each is emitted with the pulse laser at a beginning of each measurement cycle of the plurality of measurement cycles; wherein, controlled by the control device, by means of the time measuring device, during each measurement cycle of the plurality of measurement cycles one of the time periods is measured for each of the coincidence signals being detected during the respective measurement cycle; wherein, controlled by the control device, the time periods measured during several measurement cycles of one of the measurement operations by means of the time measuring device are used to generate the measurement value of the respective measurement operation; wherein, controlled by the control device, an adjustment of a maximum value for an event number takes place, which corresponds to a number of time periods that are used during one of the measurement cycles to generate the measurement value of the respective measurement operation, wherein several of the time periods measured previously by means of the time measuring device are used for the adjustment; and wherein, controlled by the control device, after the adjustment of the maximum value, the coincidence time is adjusted in dependence on the maximum value and a measurement value of a background radiation determined by the control device.

Another embodiment may have a computer program for performing the inventive method when the same is executed on a computer or processor.

An embodiment relates to a laser measuring apparatus for measuring distances, comprising a pulse laser for emitting laser pulses;

a photon detection device with a group of detection units for detecting photons and for generating detection signals, wherein the detection units each generate one of the detection signals if the respective detection unit detects one of the photons;

an evaluation device for evaluating the detection signals and for outputting coincidence signals, wherein the evaluation device outputs one of the coincidence signals if a predeterminable coincidence depth is at least reached within a predeterminable coincidence time, wherein the coincidence depth indicates a number of those detection units that generate one of the detection signals within the respective coincidence time;

a time measuring device for measuring time periods from emitting one of the laser pulses to outputting one of the coincidence signals by the evaluation device; and a control device for controlling successive measurement operations, wherein one measurement value is generated for one of the distances, wherein the control device is configured such that a plurality of measurement cycles are performed during the measurement operation;

that one of the laser pulses is emitted each with the pulse laser at the beginning of the measurement cycles;

that one of the time periods each is measured during the measurement cycles by means of the time measuring device for a plurality of the coincidence signals that are detected during the respective measurement cycle;

that the time periods measured during several of the measurement cycles of one of the measurement operations by means of the time measuring device are used to generate the measurement value of the respective measurement operation;

that an adjustment of a maximum value for an event number takes place that corresponds to the number of time periods that are used during one of the measurement cycles for generating the measurement value of the respective measurement operation, wherein several of the time periods measured previously by means of the time measuring device are used for the adjustment; and that after the adjustment of the maximum value, the coincidence time is adjusted in dependence on the maximum value and a measurement value of a background radiation determined by the control device.

The detection of several events within one measurement cycle increases the resistance to background light and thus allows a reliable measurement with higher background light, since despite the detection of background events preceding the laser pulse, the same can still be detected.

By variably adapting a maximum value to the measurement conditions for the number of time periods used during one of the measurement cycles for generating the measurement value of the respective measurement operation, the data volume of the distance measurement can be significantly reduced without reducing the accuracy of the distance measurement. In many cases, the speed of the distance measurement can also be increased thereby. The measurement conditions on which the adjustment of the maximum value depends can be estimated by evaluating previously measured time periods.

In particular, the maximum value can be reduced for shorter previously measured time periods, i.e. for short measurement distances, and increased for longer previously measured time periods, i.e. for large measurement distances. Likewise, the proportion of background photons in the detected photons can be derived from the previous measured time periods. The maximum value can be increased for a large proportion of background photons and the maximum value can be decreased for a small proportion of background photons.

The use of adaptive coincidence reduces the disturbing influence of background light by exploiting temporal correlation between incident photons and this increases the dynamic range of the laser measuring apparatus further. For this purpose, the coincidence time is adapted to the intensity of the background light during operation of the laser measuring apparatus. Compared to a fixed coincidence time, an adjustment of these parameters allows a detection of weaker signals, which improves the performance of the system at high distances and low reflectances or allows the use of a lower laser power. Adapting the coincidence time to extend the dynamic range additionally increases the signal-to-background ratio (SBR) and thus increases the range of the system.

Here, the invention has recognized that for maximizing the range, tuning of the maximum value and the coincidence time is needed. For this purpose, it is intended to first adjust the maximum value and then to adjust the coincidence time in dependence on the maximum value and a measurement value of a background radiation determined by the control device. The measurement value of the background radiation indicates how many photons from the background are detected in a specific time window. This measurement value is determined by counting the photons for the duration of the time window, wherein the timing of the detection of the photons is irrelevant. Such a method can also be called counting mode.

The evaluation device, the time measuring device and/or the control device can each be a processor configured as hardware or as a combination of software and hardware. The processors can be realized completely separately from each other or such that the same share at least parts of the software and/or parts of the hardware.

Possible fields of application for the inventive laser measuring apparatus are driver assistance systems, autonomous vehicles, safety monitoring devices and medical devices.

According to a further development of the invention, the control device is configured such that the coincidence time is adjusted based on a table stored in the control device. Hereby, the measuring speed of the laser measuring apparatus can be increased and the complexity of the laser measuring apparatus can be reduced.

According to a further development of the invention, the control device is configured such that after the adjustment of the maximum value, the coincidence depth is adjusted in dependence on the maximum value and the measurement value of the background radiation. Thereby, the range can be further increased.

According to a further development of the invention, the control device is configured such that the coincidence time and/or the coincidence depth are adjusted based on a table stored in the control device. Thereby, the measuring speed of the laser measuring apparatus can be increased and the complexity of the laser measuring apparatus can be reduced.

According to a further development of the invention, the control device is configured such that, for determining the measurement value of the background radiation, the coincidence depth is set to a value n=1 and the maximum value is set to a value $N_{PH}=1$. This allows the range to be further increased.

According to a further development of the invention, the control device is configured such that the adjustment of the maximum value takes place after a completion of the measurement cycles of one of the measurement operations, wherein the time periods measured during the measurement cycles of the respective measurement operation are used to adjust the maximum value and to generate the measurement value of the respective measurement operation. Adjusting the maximum value in this way after each of the measurement operations ensures that the maximum value best adapted to the external conditions is used in the respective subsequent measurement operation, so that the range is maximized.

According to a further development of the invention, the control device is configured to detect signal-to-noise ratios for different values of the maximum value and to adjust the maximum value such that the maximum value assumes a smallest possible value where a signal-to-noise ratio of the laser measuring apparatus exceeds a threshold. This allows the maximum value to be optimized in a simple manner, which further benefits the range.

According to a further development of the invention, the control device is configured such that those of the coincidence signals that are generated during the measurement cycles of one of the measurement operations each until a time interval that corresponds to a maximum range of the laser measuring apparatus expires, are stored in several measurement histograms, wherein one of the measurement histograms each is generated for different values of the maximum value; and that those of the coincidence signals that are generated during the measurement cycles of this one of the measurement operations each after the time interval has expired, are stored in several background histograms, wherein one of the background histograms each is generated for different values of the maximum value; wherein the detection of the signal-to-noise ratios for the different values of the maximum value takes place based on the measurement histograms and the background histograms. This allows the maximum value to be optimized in a simple manner, which further benefits the range.

According to a further development of the invention, the detection units each include at least one single-photon avalanche diode. Single-photon avalanche diodes (SPAD) are avalanche photodiodes that are operated above their breakdown voltage. In this so-called Geiger region, a single-photon absorbed in the active region of the diode and generating a free charge carrier is sufficient to lead to breakdown of the diode and thus to a macroscopic current flow through the diode. Single-photon avalanche diodes thus enable the detection of single photons. Basically, each detection unit can comprise one or more single-photon avalanche diodes.

In another aspect, the invention relates to a method for operating a laser measuring apparatus for measuring distances, wherein the laser measuring apparatus comprises a pulse laser for emitting laser pulses, a photon detection device with a group of detection units for detecting photons and for generating detection signals, wherein the detection units each generate one of the detection signals if the respective detection unit detects one of the photons, an evaluation device for evaluating the detection signals and for outputting coincidence signals, wherein the evaluation device outputs one of the coincidence signals if a predeterminable coincidence depth is at least reached within a predeterminable coincidence time, wherein the coincidence depth indicates a number of those detection units that generate one of the detection signals within the respective coincidence time, a time measuring device for measuring time periods from emitting one of the laser pulses to outputting one of the coincidence signals by the evaluation device, and a control device for controlling successive measurement operations, wherein one measurement value each is generated for one of the distances;

wherein, controlled by the control device, a plurality of measurement cycles is performed during the measurement operations;

wherein, controlled by the control device, one of the laser pulses each is emitted with the pulse laser at the beginning of the measurement cycles;

wherein, controlled by the control device, one of the time periods each is measured during the measurement cycles by means of the time measuring device for a plurality of the coincidence signals that are detected during the respective measurement cycle;

wherein, controlled by the control device, the time periods measured during several of the measurement cycles of one of the measurement operations by means of the time measuring device are used to generate the measurement value of the respective measurement operation;

wherein, controlled by the control device, an adjustment of a maximum value for an event number takes place, which corresponds to a number of time periods that are used during one of the measurement cycles for generating the measurement value of the respective measurement operation, wherein several time periods measured previously by means of the time measuring device are used for the adjustment; and wherein, controlled by the control device, after the adjustment of the maximum value, the coincidence time is adjusted in dependence on the maximum value and a measurement value of a background radiation determined by the control device.

In a further aspect, the invention relates to a computer program for performing a method described herein when the same is executed on a computer or processor.

BRIEF DESCRIPTION OF THE DRAWINGS

Embodiments of the present invention will be detailed subsequently referring to the appended drawings, in which.

DETAILED DESCRIPTION OF THE INVENTION

The same or equal elements or elements having the same or equivalent function are provided with the same or similar reference numbers below.

In the following description, embodiments having a plurality of features of the present invention are described in more detail to provide a better understanding of the invention. It should be noted, however, that the present invention can also be implemented by omitting some of the features described. It should also be noted that the features shown in various embodiments could also be combined in other ways, unless this is expressly excluded or would lead to contradictions.

Figure 1:
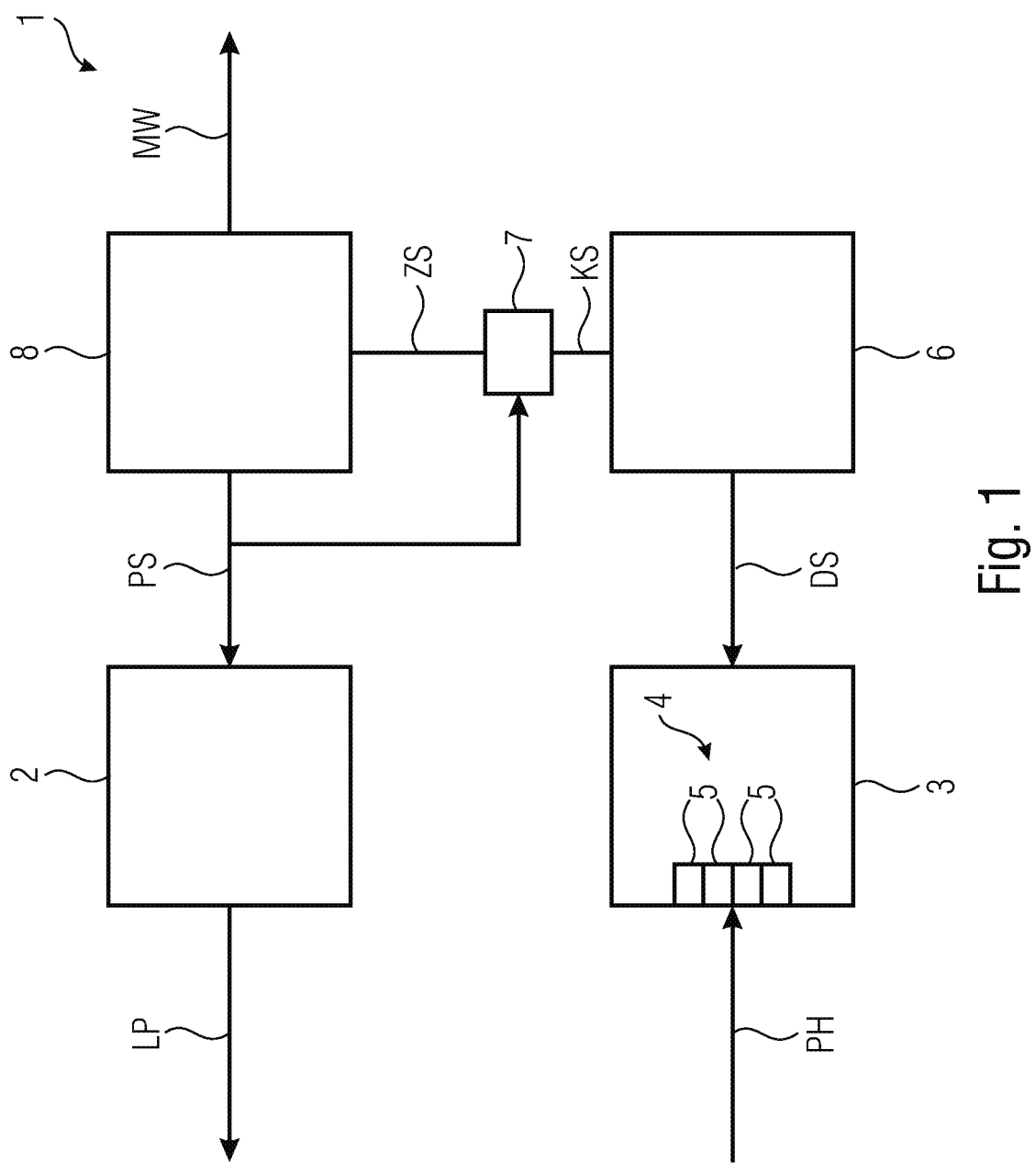
FIG. 1 is an embodiment of a laser measuring apparatus in a schematic block diagram.

FIG. 1 shows an embodiment of a laser measuring apparatus 1 in a schematic block diagram. The laser measuring apparatus 1 for measuring distances includes a pulse laser 2 for emitting laser pulses LP;

a photon detection device 3 with a group 4 of detection units 5 for detecting photons PH and for generating detection signals DS, wherein the detection units 5 each generate one of the detection signals DS if the respective detection unit 5 detects one of the photons PH;

an evaluation device 6 for evaluating the detection signals DS and for outputting coincidence signals KS, wherein the evaluation device 6 outputs one of the coincidence signals KS if a predeterminable coincidence depth is at least reached within a predeterminable coincidence time, wherein the coincidence depth indicates a number of those detection units that generate one of the detection signals DS within the respective coincidence time;

a time measuring device 7 for measuring time periods ZS from emitting one of the laser pulses LP to outputting one of the coincidence signals KS by the evaluation device 6; and a control device 8 for controlling successive measurement operations MV, wherein one measurement value MW each is generated for one of the distances, wherein the control device 6 is configured such that a plurality of measurement cycles MZ are performed during the measurement operations MV;

that one of the laser pulses LP is emitted each by the pulse laser 2 at the beginning of the measurement cycles MZ;

that one of the time periods ZS each is measured during the measurement cycles MZ by means of the time measuring device 7 for a plurality of coincidence signals KS that are detected during the respective measurement cycle MZ;

that the time periods ZS measured during several of the measurement cycles MZ of one of the measurement operations MV by means of the time measuring device 7 are used to generate the measurement value MW of the respective measurement operation MV;

that an adjustment of a maximum value MAX for an event number takes place that corresponds to the number of time periods ZS that are used during one of the measurement cycles MZ to generate the measurement value MW of the respective measurement operation MV, wherein several time periods ZS measured previously by means of the time measuring device 7 are used for the adjustment; and that, after the adjustment of the maximum value MAX, the coincidence time is adjusted in dependence on the maximum value MAX and a measurement value of a background radiation determined by the control device 8.

At the beginning of each of the measurement cycles MZ, the control device 8 generates a pulse signal PS that is transmitted to the pulse laser 2, which then emits a laser pulse LP. The group 4 of detection units 5 of the photon detection device 3 then receives photons PH, which are partly generated by the laser pulse LP or by background light. Here, each of the detection units 5 generates one detection signal DS each, provided that the same receives one of the photons PH. In the embodiment of FIG. 1, only one group 4 with four detection units 5 is shown, which form a pixel. In practice, the inventive laser measuring apparatus 1 can comprise a plurality of groups 4, wherein the number of detection units 5 does not necessarily have to be 4. It is only essential that there is more than one detection unit 5.

Each of the detection signals DS is then transmitted to the evaluation device 6, wherein the evaluation device 6 outputs a coincidence signal KS if a predeterminable coincidence depth KIT is reached or exceeded within a predeterminable coincidence time KIZ. The coincidence signals KS are then transmitted to the time measuring device 7 which, based on the pulse signal PS provided to the same and the coincidence signals KS, measures time periods ZS which each extend from the emission of one of the laser pulses LP to the output of one of the coincidence signals KS. The time periods ZS are then transmitted to the control device 8. A maximum value MAX is predetermined for an event number that corresponds to the number of time periods ZS that are used during one of the measurement cycles MZ to generate the measurement value MW of the respective measurement operation MV.

The maximum value MAX is variable and is adjusted based on previously measured time periods ZS. The coincidence time KIZ is also variable and is adjusted after the maximum value MAX has been adjusted in dependence on the maximum value MAX and a measurement value MWH of a background radiation determined by the control device 8.

The measurement value MW is calculated and output when a predetermined number of measurement cycles MZ has been performed.

FIGS. 2 to 5 are used below to illustrate multi-event detection.

Figure 2:
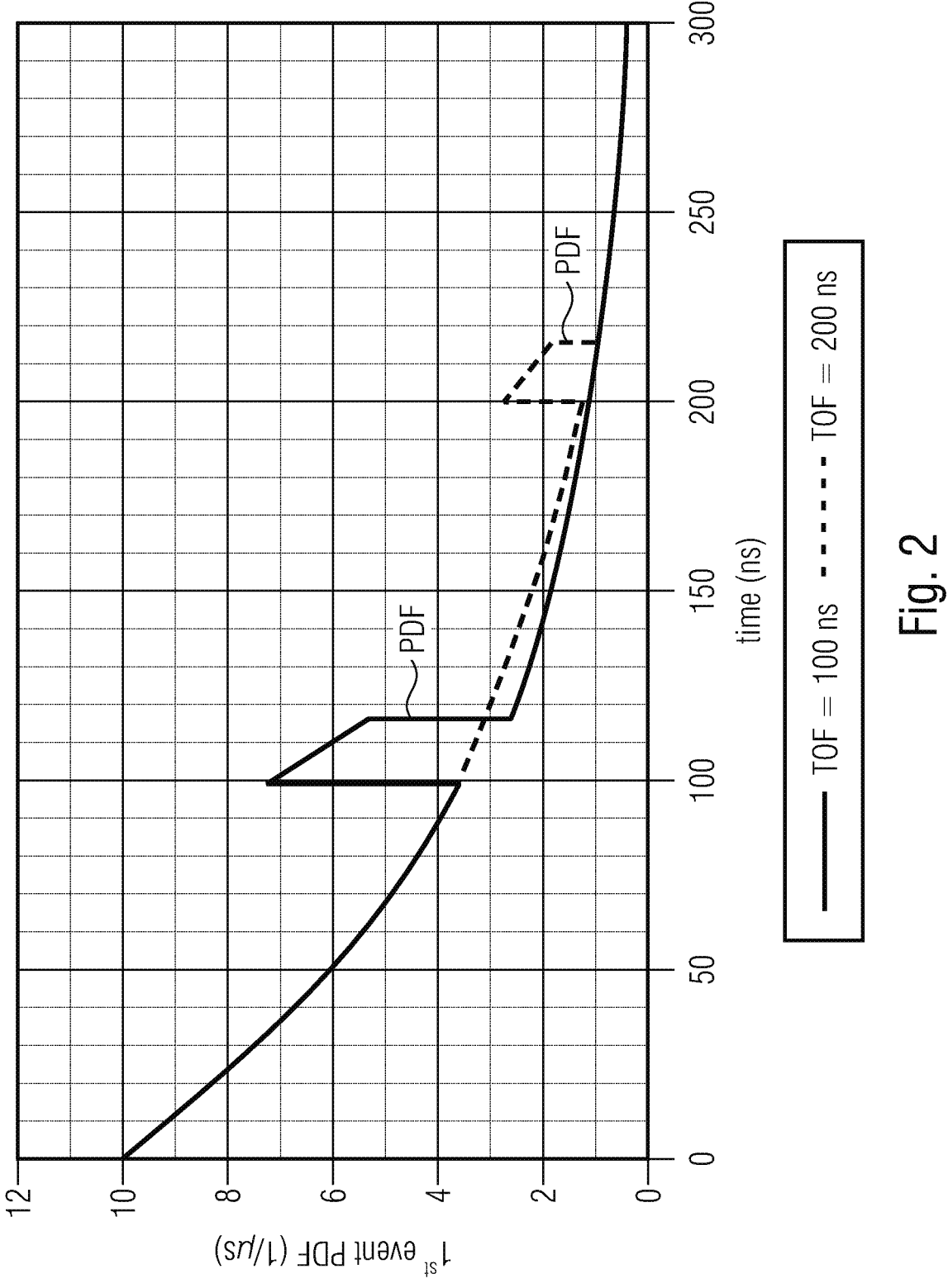
FIG. 2 is an exemplary probability density function for the first detection of a photon for different pulse propagation times.

FIG. 2 shows an exemplary probability density function PDF for the first detection of a photon PH for different pulse propagation times. In the direct propagation time-based method for distance measurement based on the detection of the respective first event in each measurement cycle, the probability density function PDF of the first detected photon P (t), which is also referred to as the first event, is given by $$P(t) = R(t)\left(1 - \int_0^t P(t)dt\right) \tag{1}$$

with the time-dependent event rate R(t). Assuming a time-invariant event rate R, which is true to a good approximation when considering only the background light due to the shortness of the measurement period, P(t) is obtained according to an exponential distribution corresponding to $$P(t) = R \exp(-Rt). \tag{2}$$

With additional consideration of the event rate of the reflected laser pulse $R_A$, the PDF results in $$P(t) = \tag{3}$$
$$\begin{cases} R_B \exp(-R_B t) & \text{for } 0 \le t < T_{TOF} \\ R_{AB} \exp(-R_{AB}(t - T_{TOF})) \exp(-R_B T_{TOF}) & \text{for } T_{TOF} \le t < T_{TOF} + T_p \\ R_B \exp(-R_B t) \exp(-R_A T_p) & \text{for } T_{TOF} + T_p \le t \end{cases}$$

with the event rate of the background $R_B$, the propagation time (or time of flight) $T_{TOF}$, the pulse width $T_P$ and $R_{AB} = R_A + R_B$. This has the effect that as the measurement distance and background intensity increase, the probability of receiving an event originating from the background increases. Accordingly, the probability of receiving an event of the reflected laser pulse decreases with increasing distance. FIG. 2 shows the calculated probability density function PDF according to (3) for event rates of the background and laser pulses of 10 MHz each, a pulse width of 16 ns and a propagation time of 100 ns and 200 ns, respectively. Here it can be seen that the resulting pulse is lower at higher distance, which corresponds to a reduced probability for its detection.

Figure 3:
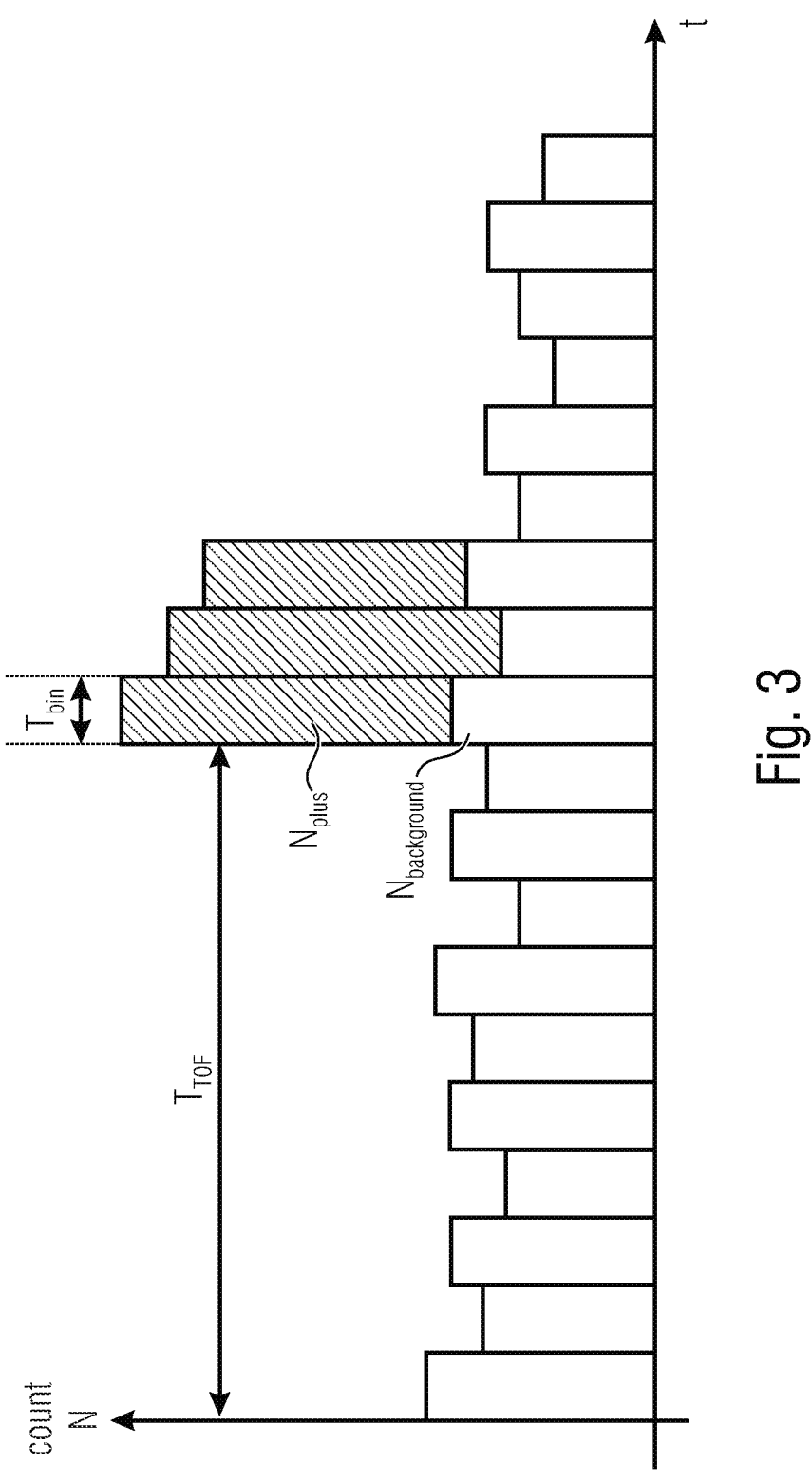
FIG. 3 is an exemplary schematic representation of a histogram of detected photons.

FIG. 3 shows an exemplary schematic representation of a histogram of detected photons PH. In the direct method for distance measurement, the arrival time of the first received event measured from the time of pulse emission across several measurement cycles MZ can be stored in a histogram, from which the actual propagation time is subsequently determined by a suitable evaluation rule. A possible evaluation variation is mean-value filtering of the histogram, which serves to reduce the variance of the individual bins, with subsequent maximum value determination, wherein the temporal position of the maximum represents the measured propagation time. To determine the expected values of all bins of the histogram, the PDF (t) is considered. Integrating this function across the time domain of the bin multiplied by the number of summed time values provides the respective expected value of the bin. Based on the histogram and assuming Poisson distributed counts in the bins, a measure of the quality of the measurement can be defined.

FIG. 3 schematically shows the histogram after the accumulation of several measured time values, which can be converted into time periods ZS. The white areas of the bins represent the events caused by background light, while events of the reflected and detected laser pulse are shown in a hatched manner. For the position of the pulse in the histogram to be reliably determined, the first bin after the arrival of the reflected pulse is to have a higher value than bins that only detected background. The quotient of pulse-generated count $N_{pulse}$ and the standard deviation of the entire bin $N_{pulse} + N_{background}$, which is given by the root of the expected value according to the Poisson distribution, provides a measure for this. Accordingly, the signal-to-noise ratio (SNR) is defined as $$SNR = \frac{N_{pulse}}{\sqrt{N_{pulse} + N_{background}}} \tag{4}$$

with the number of counted events due to the pulse $N_{pulse}$ and the background $N_{background}$ Since these counts are a function of time and the goal of data analysis is to determine the pulse arrival time, the counts are considered at the time of pulse arrival, which corresponds to the pulse propagation time $T_{TOF}$. If the exponential distribution according to (3) is taken as a basis, the following applies $$SNR = \sqrt{N_{cycle} T_{Bin}} \frac{P(T_{TOF})|_{R_A \ne 0} - P(T_{TOF})|_{R_A = 0}}{\sqrt{P(T_{TOF})|_{R_A \ne 0}}} \tag{5}$$

$$= \sqrt{N_{cycle} T_{Bin} \exp(-R_B T_{TOF})} \frac{R_A}{\sqrt{R_A + R_B}}$$

with the event rate of the reflected laser pulse $R_A$ and of the background light $R_B$. This reveals two factors that result in a decrease of the signal-to-noise ratio, and thus the quality of the measurement, with increasing propagation time $T_{TOF}$. The factor $\exp(-R_B T_{TOF})$ results from the exponential distribution of the probability density according to (3), which is a consequence of the fact that only one event is detected in each measurement cycle. This is of particular interest for further consideration. The second factor is the decrease in the intensity of the reflected laser pulse LP, which is shown by a decrease in $R_A$ and will not be considered in further detail. The signal-to-noise ratio is used to compare a measurement cycle MZ with single detection with a measurement cycle MZ with multiple detection.

Figure 4:
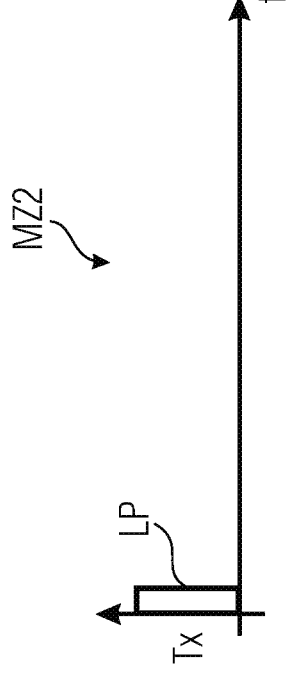
FIG. 4 is an exemplary illustration of the detected photons in a single detection in one measurement cycle and in a multiple detection in one measurement cycle.
Figure 4:
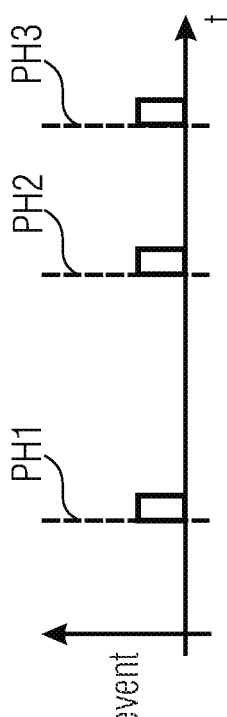
Figure 4:
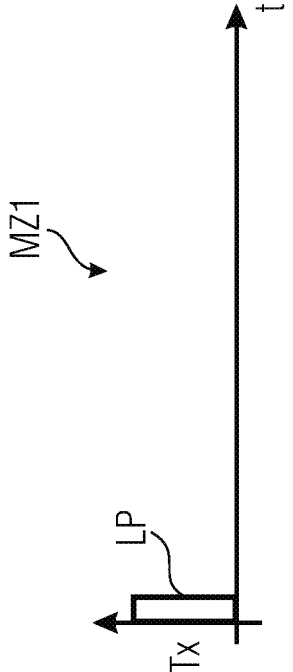
Figure 4:
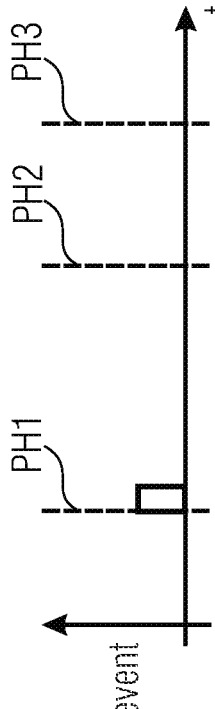

FIG. 4 shows an exemplary illustration of the detected photons PH during a single detection in a measurement cycle MZ1 and during a multiple detection in a measurement cycle MZ2. By detecting multiple events within the measurement cycle MZ2, the presented method increases the resistance to background light and in this way allows a reliable measurement at higher background light, since photons PH from the background that arrive prior to the photons PH of the laser pulse LP do not prevent the detection of photons PH from the laser pulse LP.

As an illustration, FIG. 4 shows on the left the waveform for single detection. Here, detection in the measurement cycle MZ1 ends after the detection of a photon PH1 originating from the background, so that the photons PH2 and PH3 generated by the laser pulse LP and reflected by the target object are not detected. In the measurement cycle MZ2 with multiple detection, as shown in FIG. 4 on the right, the photons PH2 and PH3 generated by the laser pulse LP and reflected from the target object can be detected even after the detection of the photon PH1 originating from the background. Compared to a reduction of the sensor sensitivity, the intensity of the laser pulse LP is not reduced by the method, thus enabling higher ranges.

Figure 5:
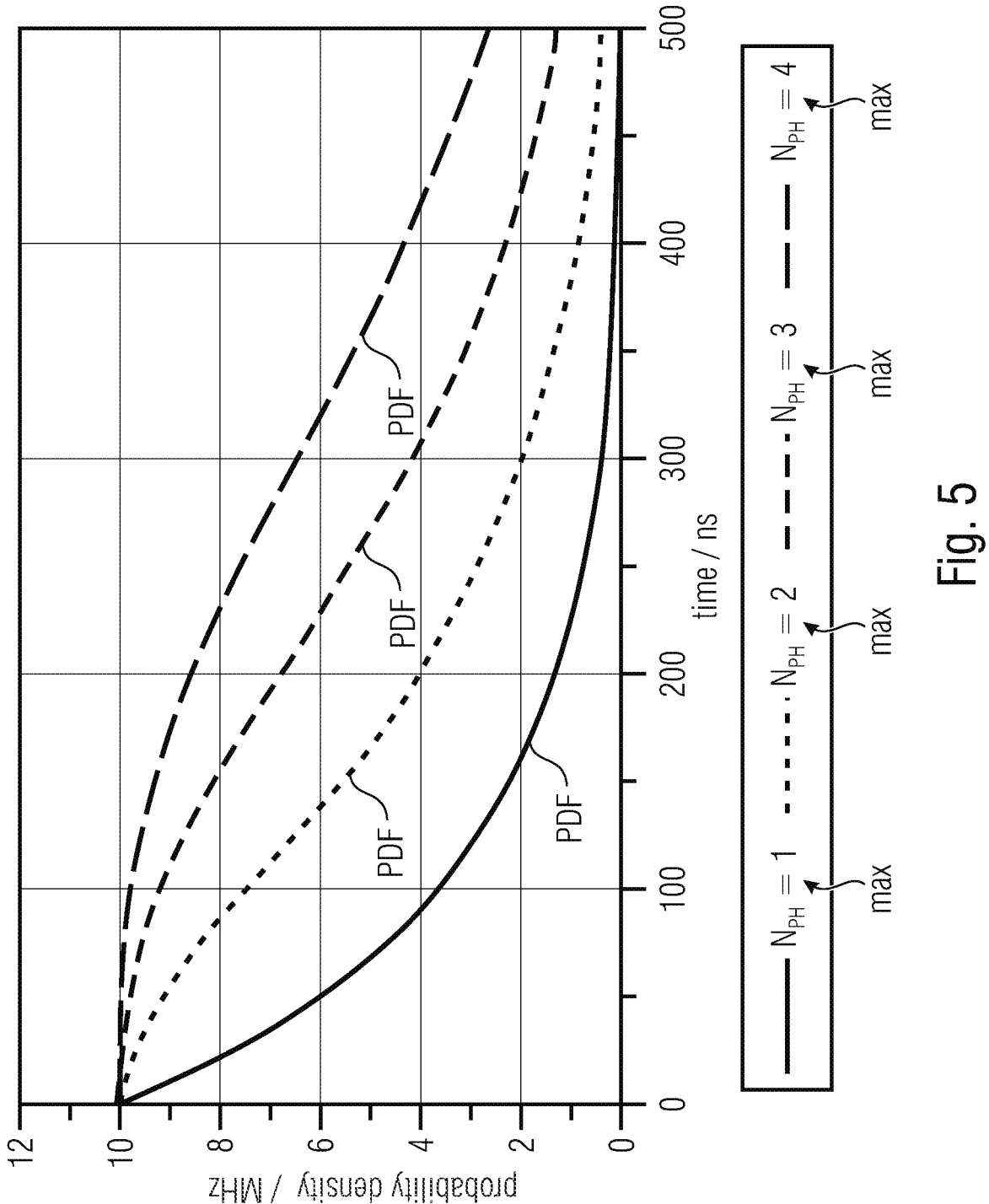
FIG. 5 are exemplary calculated probability densities of photon detection for different maximum values for the event number.

FIG. 5 shows exemplary calculated probability densities of photon detection for different maximum values MAX for the event number.

The presented method is based on the known direct method for propagation time determination. However, during a measurement cycle MZ, which consists of the emission of a laser pulse LP and the reception of the photons, not only the arrival time of the first received photon—or event in general—is detected, but the arrival time of several events is detected. The exact number of possible events within a measurement cycle MZ is initially irrelevant.

To estimate the performance of the method, the signal-to-noise ratio according to (5) is considered below. This is based on the number of events in the bin of histogram 7 at the time of pulse arrival and can be determined from the probability density function PDF. Considering the background alone, i.e. without reflected laser signal, and neglecting the dead time, the probability density function PDF is given by the sum of the Erlang distribution for K=1, 2 . . . $N_{Ph}$, wherein $N_{Ph}$ represents the number of event detections in the measurement cycle, corresponding to $$P_{Ph}(t) = \sum_{k=1}^{N_{Ph}} \frac{R_B^K t^{k-1}}{(k-1)!} \exp(-R_B t) \tag{6}$$

The PDF according to (6) as a function of time for a background event rate $R_B$ of 10 MHz is illustrated in FIG. 5 for different maximum values MAX for the number of possible detections. For a maximum value of 1, the known exponential distribution results. With increasing maximum value, the range of a constant density increases at the beginning of the measurement cycle MZ and at the same time the curve decreases more slowly. Since the value of the probability density function PDF at the time of pulse arrival has a direct effect on the quality of the measurement, a higher maximum value MAX suggests an improvement of the measurement.

12

Figure 6:
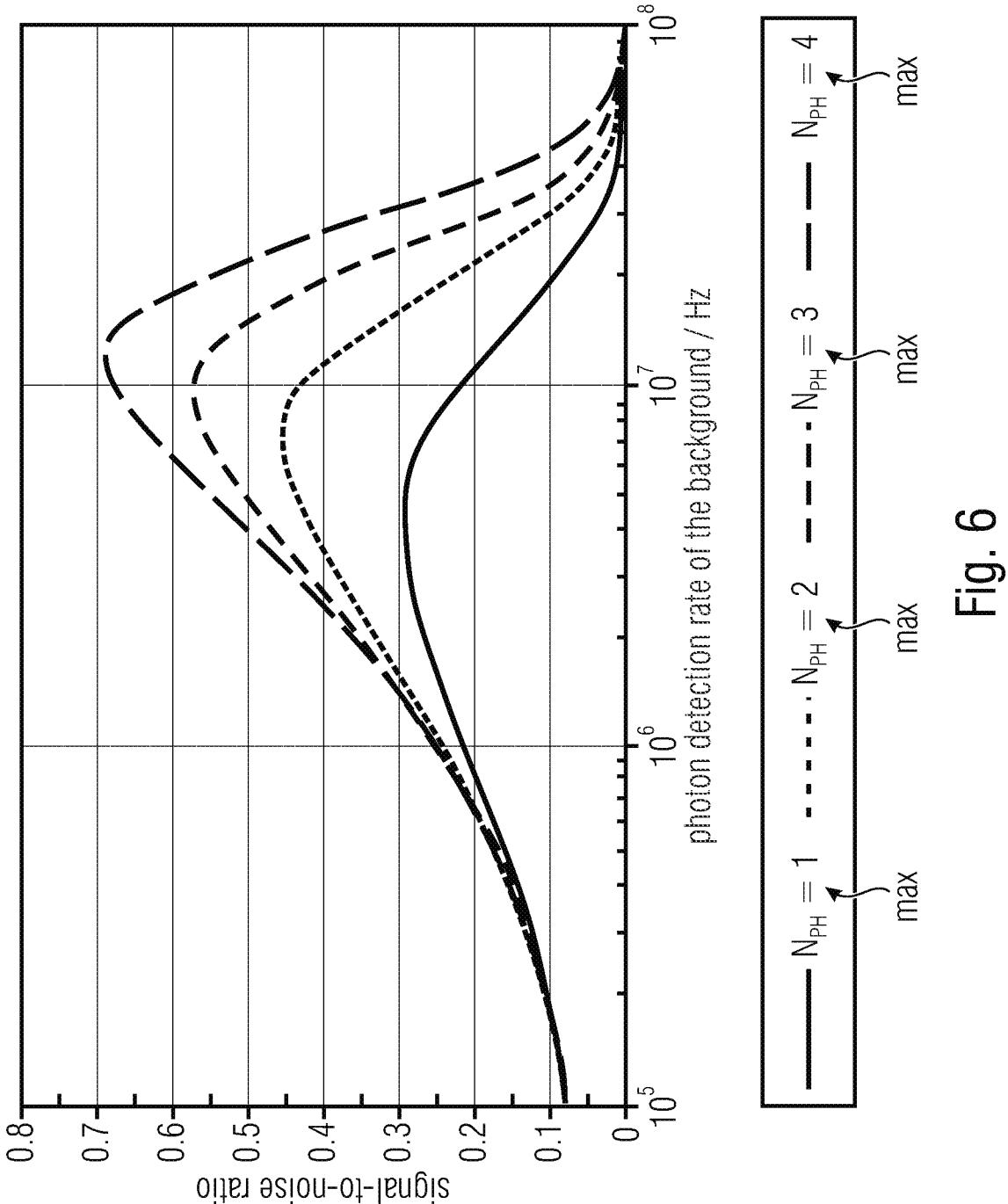
FIG. 6 are exemplary calculated signal-to-noise ratios for different maximum values for the event number.

FIG. 6 shows exemplary calculated signal-to-noise ratios for different maximum values MAX (event depths).

The probability density function PDF is not needed for determining the signal-to-noise ratio when the photon rate of the reflected laser pulse is also considered. Instead, the signal-to-noise ratio can be expressed in general terms by $$SNR = \sqrt{\frac{N_{cycle} T_{Bin} P_{Ph}(T_{TOF})}{R_B}} \frac{R_A}{\sqrt{R_A + R_B}} \tag{7}$$

The factor $P_{Ph}(T_{TOF})/R_B$ accounts for the reduction of the detection probability of a photon with increasing propagation time. For $N_{Ph}=1$, the factor corresponding to (5) is given by $\exp(-R_B T_{TOF})$. FIG. 6 shows the calculated signal-to-noise ratio for different $N_{Ph}$ for a propagation time of 250 ns. This shows a significant increase in the signal-to-noise ratio for an event rate of 10 MHz, which corresponds to the expectations from FIG. 5. At lower or higher rates, the curves approximate each other, corresponding to a shift in the propagation time in FIG. 5 and thus also corresponds to the expectations due to the approximating probability density functions PDF.

Further, the maximum of the signal-to-noise ratio shifts to higher rates with increasing maximum MAX of possible detections. Accordingly, the considered concept is especially interesting for higher background intensities. Another advantage is an improved detection of several signal pulses, which can result from multiple or partial reflection of the laser signal. Thus, in case of a strong reflection at an object, which is located further to the front in the scene and triggers the detector, the detection of a second, more distant object is possible.

Figure 7:
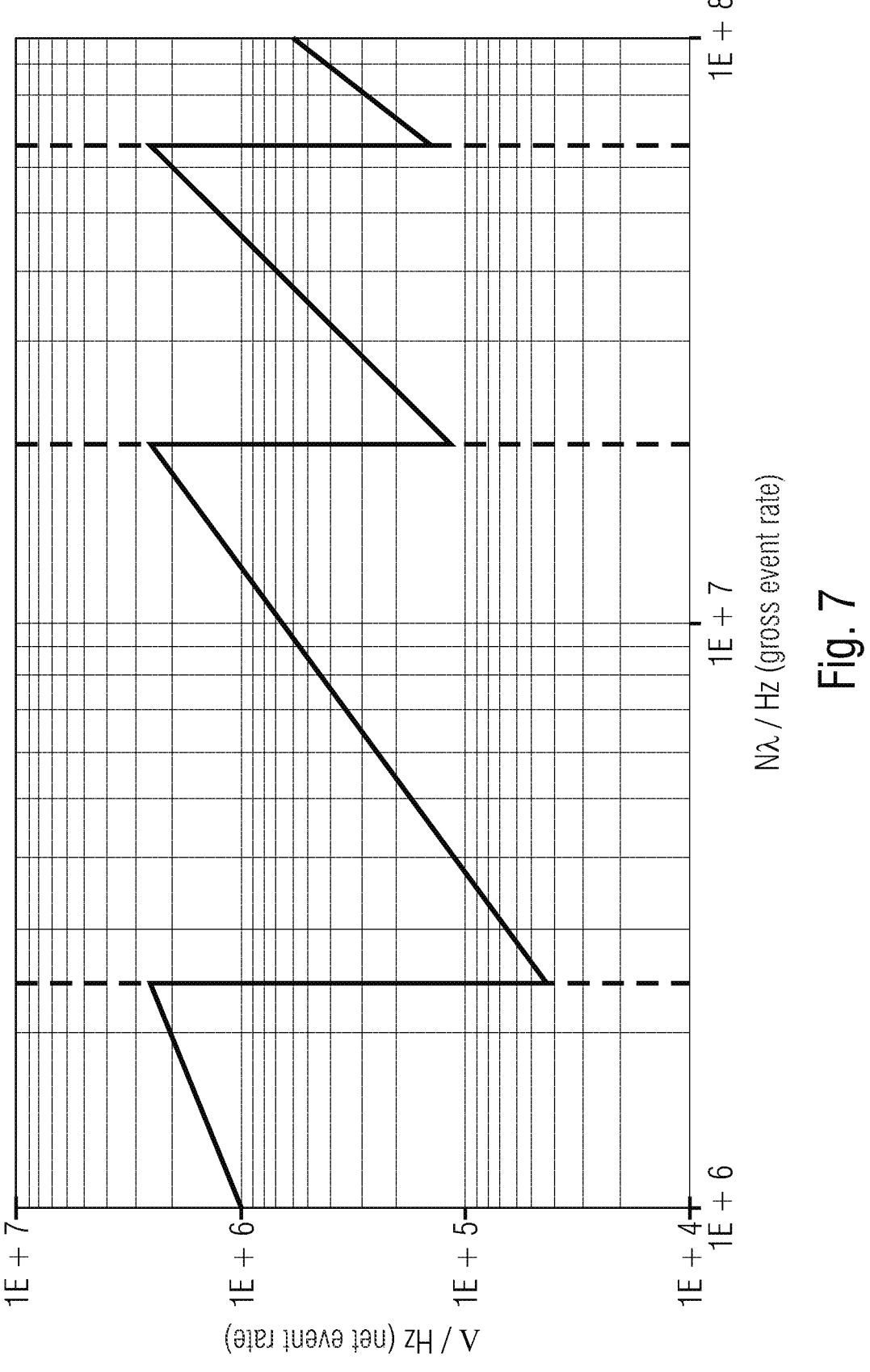
FIG. 7 is an example of the net event rate in dependence on the coincidence depth.

FIG. 7 is used below to illustrate detection with adaptive coincidence. Methods for distance measurement with adaptive coincidence usually comprise several steps. In a first step, the intensity of the background light can be measured. For this purpose, the incident background radiation can be detected on the photon detection device in the blanking interval (i.e., without active illumination by the laser). From the number of background events and the duration of the measurement window, the rate and thus the intensity of the background light can be determined. The integration can be realized with or without coincidence. Based on the background measurement, the suitable coincidence time KIZ and the suitable coincidence depth KIT can be further determined and adjusted in the evaluation device 6 for coincidence detection. As a further step, the measurement of the distance can be determined via the direct method by means of the measurement of the pulse propagation time. An estimate of the target value of the background interval rate can be made from the maximum distance d, the number of individual measurements accumulated in the histogram to determine the distance N and the width of the bins $T_{Bin}$. For this purpose, as with multiple event methods, the signal-to-noise ratio of the histogram can be considered. The signal-to-noise ratio can be defined as the expected value of the additional count in the bin due to the reception of the reflected pulse divided by the standard deviation of the total count including background events.

From the probability distribution of the first event with a square pulse and constant background rate, the signal-to-noise ratio can be calculated to be $$SNR_{Hist} = \sqrt{NT_{Bin} e^{\frac{2\lambda_B d}{c}}} \frac{\lambda_A}{\sqrt{\lambda_A + \lambda_B}} \tag{8}$$

with a maximum at $\lambda_B = c*d/2$ assuming a constant signal-to-background ratio (SBR), corresponding to a variation of the reflection factor at constant distance.

For this background rate AB, measuring the distance using the direct method provides the best result. Since the event target value obtained in this way is a function of the distance, the same is calculated for the maximum distance of the system. Here, the range also depends on the quality of the algorithm used to calculate the distance from the histogram. Up to which signal-to-noise ratio the algorithm can determine the distance from the histogram with predetermined accuracy and reliability can be determined by further theoretical examination or by means of simulation.

FIG. 7 shows exemplarily how the net event rate (plotted on the y-axis, $\Lambda$/Hz) can be kept at a relatively constant level by adapting the coincidence depth from n=1 (no coincidence) to n=4 as the gross event rate (plotted on the x-axis, N*$\lambda$/Hz) changes.

For real applications, the ripple of the curve in FIG. 7 should be as low as possible, since the laser signal is attenuated in addition to the background light and may not fall below a certain value in order to be reliably detected. A reduction of the ripple in the net event rate can be obtained by an additional adaptation of the coincidence time.

For a coincidence depth of n=2, the time between two events has to be less than the value $\vartheta$ the coincidence time KIZ. From the exponential distribution of the time between two successive events, the probability of this can be determined by integration. Multiplying the probability determined in this way by the original event rate, the following results $$\Lambda_{Approx,2} = \lambda(1 - e^{-\lambda\vartheta}) \approx \lambda^2\vartheta. \qquad (9)$$

In contrast, the probability for coincidence with n=3 can be calculated from the Erlang distribution. For the resulting rate, the following results $$\Lambda_{Approx,3} = \lambda(1 - (1+\lambda\vartheta)e^{-\lambda\vartheta}) \approx \lambda^3\vartheta^2. \qquad (10)$$

For an arbitrary coincidence depth n, an approximate proportionality of $$\Lambda_{Approx,n} \propto N^n \lambda^n \vartheta^{n-1}. \qquad (11)$$

is obtained. This approximation (11) shows how the individual amounts influence the resulting event rate. Thus, the value $\vartheta$ of the coincidence time KIZ has a greater influence at higher values n of the coincidence depth KIT than at lower values n. In the interest of eye safety and the lowest possible laser power, the attenuation of the reflected pulse may only be as strong as needed to lower the net event rate of the background radiation to a tolerable level. Conversely, high ripple involves higher laser power.

Approximation (11) shows another way to adjust the net event rate by switching off individual receiving elements N or individual subpixels. Specifically, this technique can be used to smooth the transition between no coincidence (n=1) and coincidence (n=2) by gradually reducing the active subpixels. In general, this provides another variable to reduce ripple.

Changing the slope of the curve of the net event rate with the coincidence depth KIT results in a higher signal-to-background ratio at higher rates and higher coincidence depth KIT, which allows the measurement of larger distances. The decrease of the signal-to-background ratio with increasing distance remains unaffected.

The increase of the signal-to-background ratio with the coincidence depth KIT can be shown with n=2 using the approximation according to formula (9). In this case, the following applies for the new signal-to-background ratio $$SBR_{new,2} = \frac{\lambda_{AB}^2\theta - \lambda_B^2\vartheta}{\lambda_B^2\vartheta} \qquad (12)$$

$$= \frac{\lambda_A^2 + 2\lambda_A\lambda_B}{\lambda_B^2}$$

$$= SBR_{old}^2 + 2SBR_{old} \approx SBR_{old}^2$$

which results in a doubling of the signal-to-background ratio in decibels. Analogously, this calculation can be performed for a coincidence depth of n=3 according to formula (10). Here, the following results:

$$SBR_{new,3} = \frac{\lambda_{AB}^3\vartheta - \lambda_B^3\vartheta}{\lambda_B^3\vartheta} \qquad (13)$$

$$= SBR_{old}^3 + 3SBR_{old}^2 + 3SBR_{old} \approx SBR_{old}^3$$

which corresponds to a tripling of the signal-to-background ratio in decibels. This could be continued with further coincidence depths KIT. Generally, the resulting signal-to-background ratio increases by a factor of the value n of the coincidence depth KIT when coincidence events are used.

FIGS. 8 to 15 are used below to illustrate multi-event detection with adaptive coincidence.

Figure 8:
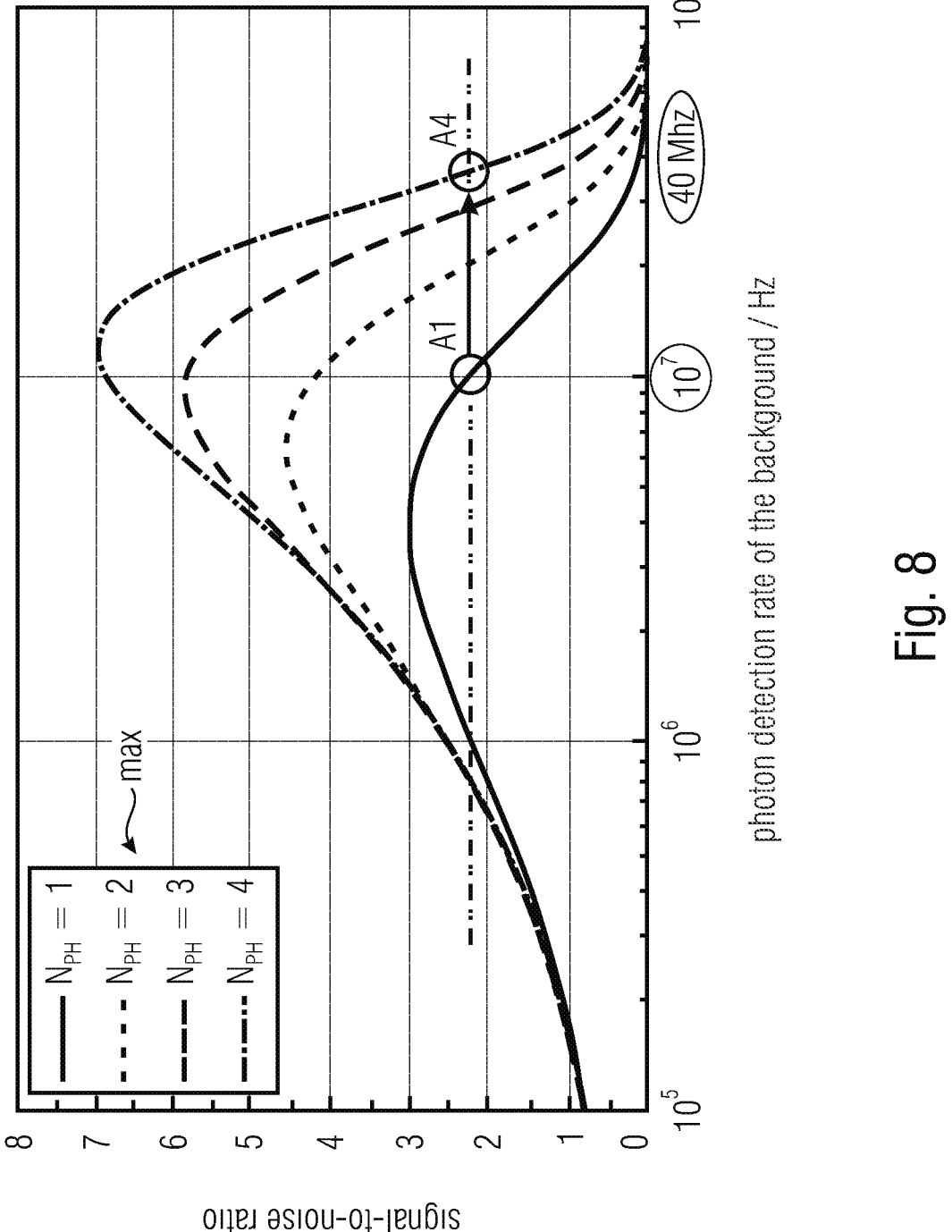
FIG. 8 is an exemplary diagram for determining the maximum value for the number of time periods of the multi-event detection.

FIG. 8 shows an exemplary diagram for determining the maximum value for the number of time periods ZS of the multi-event detection.

Due to the described ripple with adaptive coincidence, there is a strong decrease of the net event rate at the respective switching thresholds. This is problematic for control, since no continuous regulation of the net event rate can take place. In practice, this can lead to a reduction of the net laser event rate to zero. In order to avoid such a detection failure, there is, on the one hand, the above-described possibility to vary not only the coincidence depth KIT but also the coincidence time KIZ. The disadvantages of a higher coincidence time KIZ are the increased pixel complexity and the reduced time resolution. On the other hand, multi-event detection offers the possibility to remain in one coincidence setting for a longer time. Assuming an SNR threshold of about 2.2 for first photon single event detection ($N_{PH}=1$) according to FIG. 8, a reliable signal detection would exist up to a background event rate of 10 MHz (point A1 in FIG. 8). For higher rates, further adjustments of the parameters of the detection with adaptive coincidence or the parameters of the multi-event detection are needed.

If the maximum value MAX for the event number is increased, the number of detected photon events is increased first. According to FIG. 8, for a maximum value MAX of 4 photons, background rates up to 40 MHz can be tolerated (point A1 in FIG. 8) before the coincidence setting has to be changed for the first time. Similarly, it is possible to successively increase the maximum value MAX from 1 to 4 (or more) and correspondingly the background rate from 10 MHz ($N_{PH}=1$) to 20 MHz ($N_{PH}=2$) followed by 30 MHz ($N_{PH}=3$) up to 40 MHz ($N_{PH}=4$). This depends on how far the frame rate of the measurement system may be reduced, since a complete frame readout is added with each event stage.

The method sequence defined in this way thus consists in a priority of the adaptation of the maximum value MAX over an adaptation of the coincidence depth KIT and the coincidence time KIZ, resulting in a hierarchical order between the parameters of multi-event detection and the parameters of adaptive coincidence. Below, the term hierarchy model (HM) will be used for this.

Figure 9:
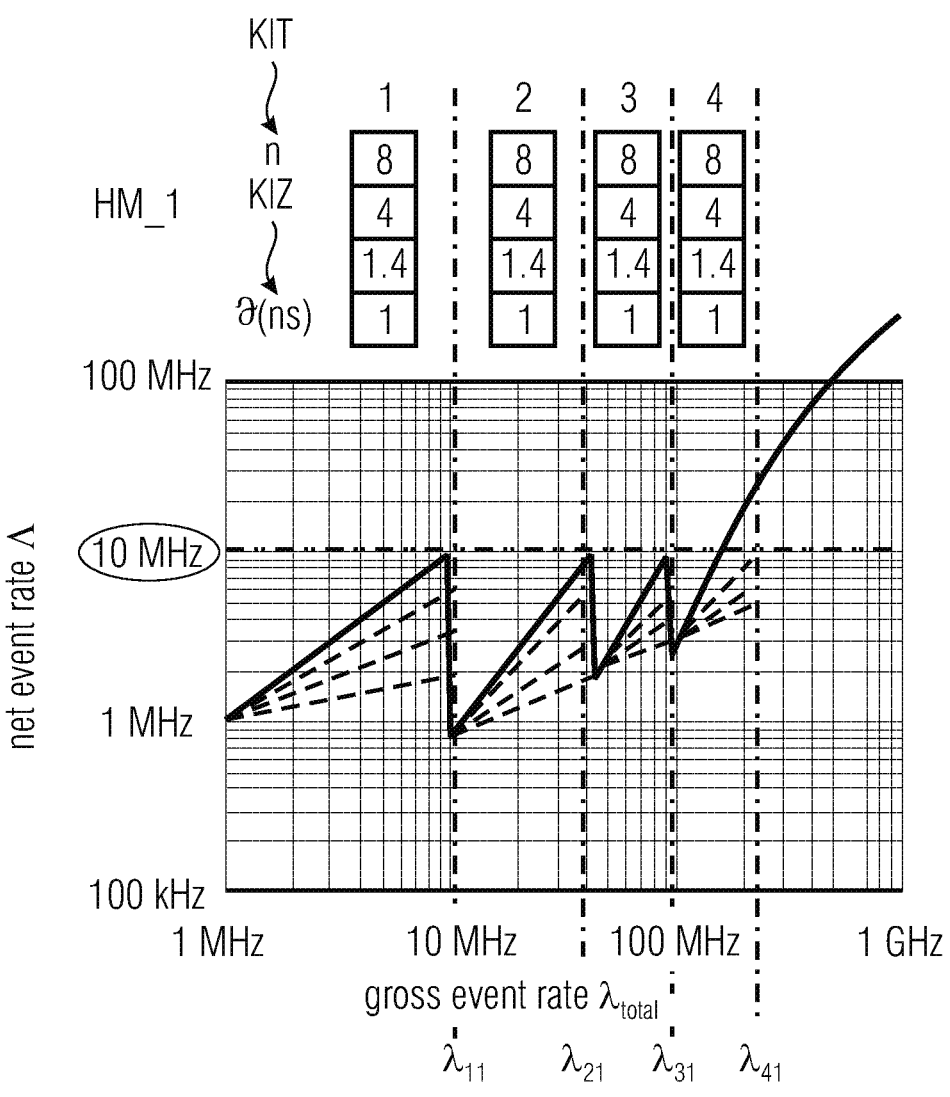
FIG. 9 is a first exemplary hierarchy model showing a net event rate in dependence on a gross event rate for different coincidence times.

FIG. 9 shows a first exemplary hierarchy model (HM1), which illustrates a net event rate in dependence on a gross event rate for different coincidence times KIZ with variable coincidence depth KIT and a maximum value MAX of $N_{PH}$=1.

Figure 10:
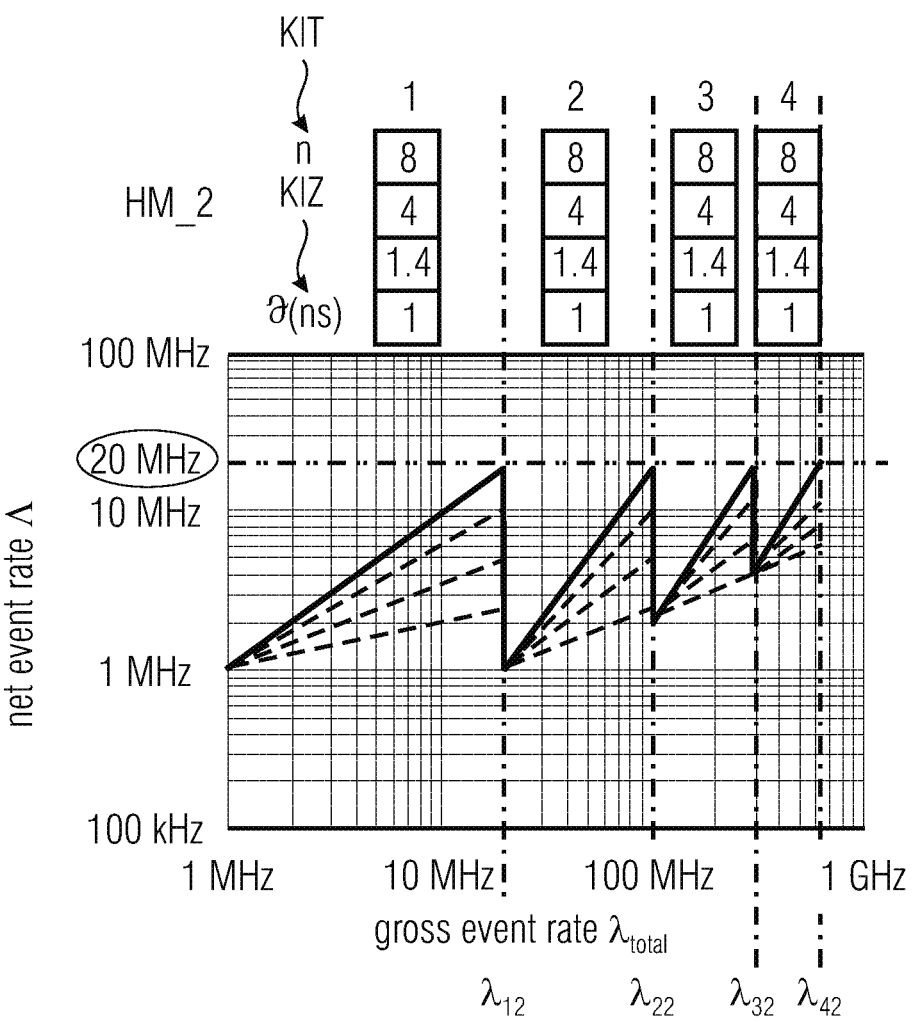
FIG. 10 is a second exemplary hierarchy model showing a net event rate in dependence on a gross event rate for different coincidence times.

FIG. 10 shows a second exemplary hierarchy model (HM2), which illustrates a net event rate in dependence on a gross event rate for different coincidence times KIZ with variable coincidence depth KIT and a maximum value MAX of $N_{PH}$=4.

FIG. 9 shows an excerpt of the adaptive coincidence rule at a maximum value MAX for the event number of $N_{PH}$=1, which varies the stages from 1 to 4 for a coincidence time of 10 ns depending on the measured background rate. For single event detection (HM stage=1 or $N_{PH}$=1), the first switching threshold A1 (cf. also FIG. 8 for constant SBR) is at 10 MHz. If the HM stage is set to 4 single event detections, as shown in FIG. 10, the first switching threshold increases to 40 MHz gross event rate, and point A1 changes to point A4 (cf. again FIG. 8). This accomplishes several things: the first coincidence stage is maintained up to a gross event rate of $\lambda_{total}$=40 MHz, which corresponds to 4 times the original operating range. Subsequently, all further coincidence stages shift to higher gross event rates and as a result, the dynamic range increases. In FIG. 10, the new control ranges are highlighted by a dash-dotted representation. The original upper limit of the net event rate $\Lambda_o$ increases from 10 MHz to 40 MHz. Another effect can be seen in the increase of the lower limit $\Lambda_o$. Thereby, the gross event rate $\lambda_{total}$ is less attenuated than in the absence of the HM. This also attenuates the received laser event rate $\lambda_{Laser}$ to a lower extent, which improves the detection of objects with low reflectivity.

The implementation of the HM is based on the set of SNR curves of the ME method according to FIG. 8. The determination of the control thresholds of the gross event rate $\lambda_{total}$, which depend on the HM stage, is based on the calculated SNR according to equation (7). At the beginning of this section, the new control threshold $\lambda_{total}$ for $N_{PH}$=4 was read directly from FIG. 8 using the example of an SNR threshold of 0.2 and drawn in FIG. 10. However, this is only the first control threshold, which indicates the transition from coincidence stage 1 (no coincidence) to coincidence stage 2 (n=2 SPAD have to deliver a photon event within the coincidence time KIZ).

The determination of the further control thresholds $\lambda_{total}$ can take place by calculation starting from the first control threshold, which is nothing else than the target background rate $\lambda_{B,target}$. How this can be implemented in a procedural way is described in [4]. Exceeding the upper limit of the net event rate $\Lambda_o=\lambda_{B,target}$ is monitored by the system in the form that the prevailing background rate is determined by an independent measurement and based thereon the coincidence parameter is determined. The coincidence parameters corresponding to the respective thresholds each contain a coincidence depth KIZ and a coincidence time KIT.

In the proposed method, these parameters depend on the selected hierarchy model and the SNR threshold and can be calculated in advance and stored in a look-up table. An additional criterion can be assigned to the method. This involves that the SNR of a laser pulse detection has to be greater than 10. In practical implementation, this means that a peak has to be detected in one of the measurement histograms 9 whose maximum value entry has to be above the associated background histogram 10 without laser signal by a factor of 10.

Figure 11:
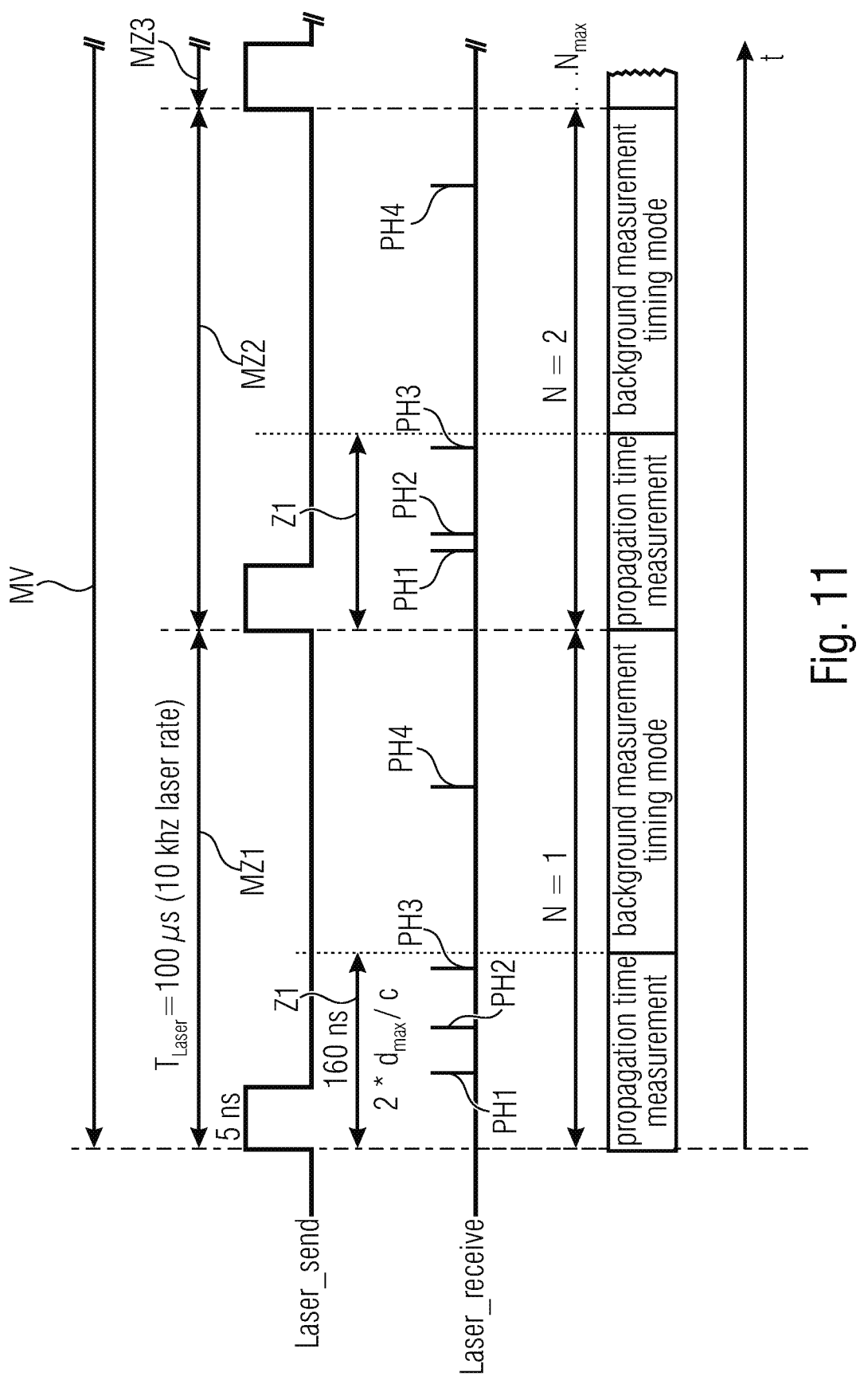
FIG. 11 is an exemplary time sequence of a measurement operation with several measurement cycles.

FIG. 11 shows an exemplary time sequence of a measurement operation MV with several measurement cycles MZ. For simplification, it is assumed that the coincidence depth KIT is one. At the beginning of the measurement cycle MZ 1, a laser pulse LP, which may have a pulse length of 5 ns, for example, is emitted. In a time interval ZI, which corresponds to the maximum detectable distance, a propagation time measurement with multi-event detection is performed. The time period ZS of the first photon PH1 is now entered in the measurement histogram at 9.1. The time period ZS of the second photon PH2 is entered in the measurement histogram 9.2 and the time period ZS of the third photon PH3 is entered in the measurement histogram 9.3, since the same are received during the time interval ZI. In contrast, the photon PH 4 received after the time interval ZI has expired is entered in the background histogram at 10.1 and used to determine a background rate in the timing mode. After the time $T_{laser}$, which is calculated from the laser rate, has expired, a new measurement cycle MZ2 begins, which runs analogously to the measurement cycle MZ 1. In the example, the time periods ZS of two photons are in the measurement histogram 9.1, in the measurement histogram 9.2 and in the measurement histogram 9.3. Likewise, the time periods ZS of two photons each are in the background histogram 10.1. After this, further measurement cycles MZ follow until a predetermined number $N_{max}$ is reached. The measurement value MW for the distance can then be calculated from the filled measurement histogram 9. In addition, the SNR can be calculated from the filled measurement histogram 9 and from the filled background histogram 10. Based on a background measurement in counting mode and the SNR, the parameters maximum value MAX, coincidence time KIZ and coincidence depth KIT can now be defined and used in a further measurement operation MV.

Figure 12:
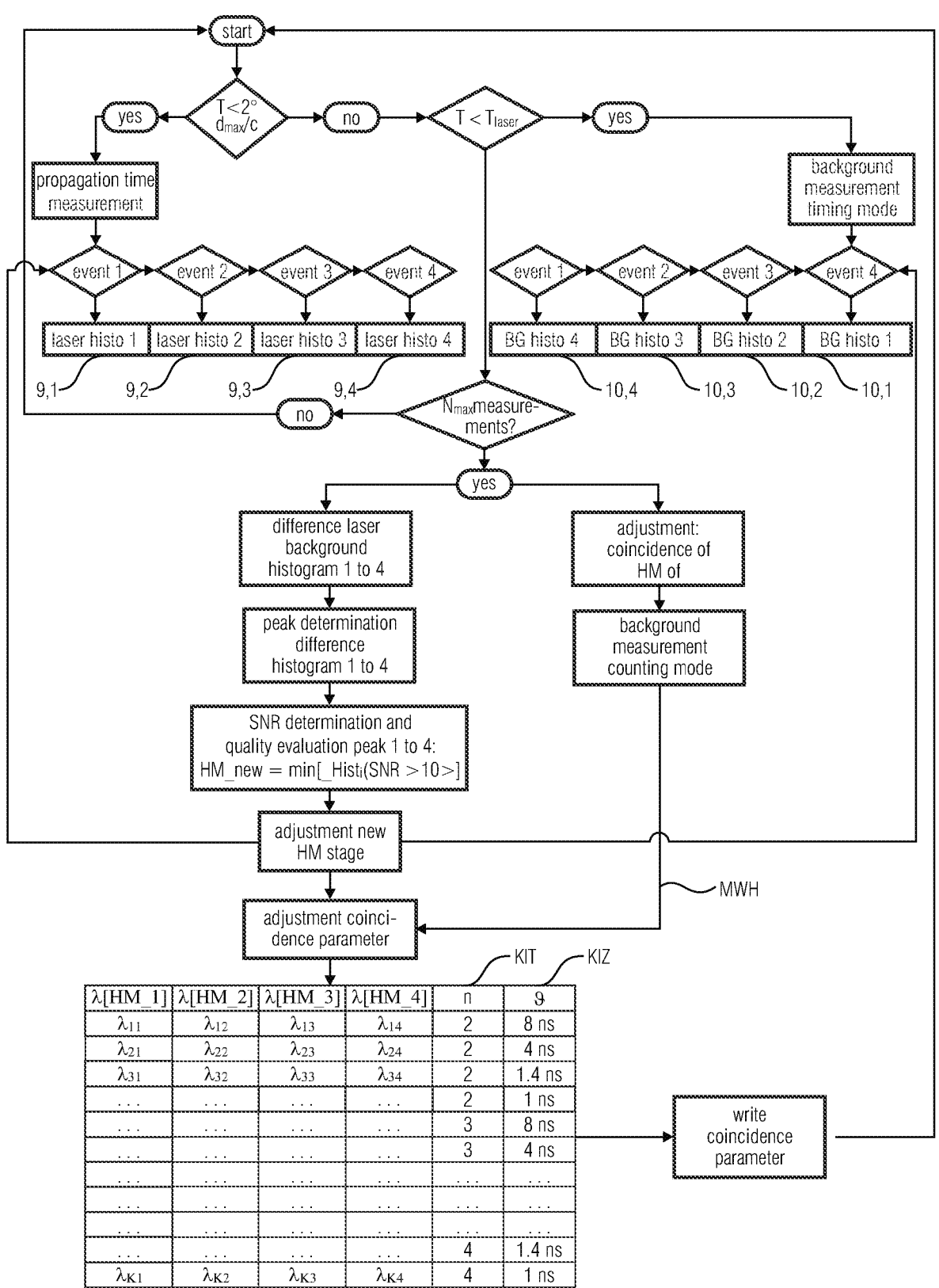
FIG. 12 is an exemplary flow diagram of the proposed method.

FIG. 12 shows an example flow diagram of the suggested method.

According to a further development of the invention, the control device 8 is configured such that the coincidence time is adjusted based on a table stored in the control device 8.

According to a further development of the invention, the control device 8 is configured such that after the adjustment of the maximum value MAX, the coincidence depth is adjusted in dependence on the maximum value MAX and the measurement value of the background radiation.

According to a further development of the invention, the control device 8 is configured such that the coincidence time and/or the coincidence depth are adjusted based on a table stored in the control device 8.

According to a further development of the invention, the control device 8 is configured such that, for determining the measurement value of the background radiation, the coincidence depth is set to a value n=1 and the maximum value MAX is set to a value $N_{PH}$=1.

According to a further development of the invention, the control device 8 is configured such that the adjustment of the maximum value MAX takes place after a completion of the measurement cycles MZ of one of the measurement operations MV, wherein the time periods ZS measured during the measurement cycles MZ of the respective measurement operation MV are used to adjust the maximum value MAX and to generate the measurement value MW of the respective measurement operation MV.

According to a further development of the invention, the control device 8 is configured to detect signal-to-noise ratios for different values of the maximum value MAX and to adjust the maximum value MAX such that the maximum value MAX assumes a smallest possible value where a signal-to-noise ratio of the laser measuring apparatus 1 exceeds a threshold.

According to a further embodiment of the invention, the control device 8 is configured such that those of the coincidence signals KS that are generated during the measurement cycles MZ of one of the measurement operations MV, each until a time interval corresponding to a maximum range of the laser measuring apparatus 1 expires, are stored in several measurement histograms, wherein one of the measurement histograms each is generated for different values of the maximum value; and that those of the coincidence signals KS that are generated during the measurement cycles MZ of this one of the measurement operations MV, each after the time interval has expired, are stored in several background histograms, wherein one of the background histograms each is generated for different values of the maximum value MAX;

wherein the detection of the signal-to-noise ratios for the different values of the maximum value MAX takes place based on the measurement histograms and the background histograms.

In another aspect, there is disclosed a method for operating a laser measuring apparatus 1 for measuring distances, wherein the laser measuring apparatus 1 comprises a pulse laser 2 for emitting laser pulses LP, a photon detection device 3 with a group 4 of detection units 5 for detecting photons PH and for generating detection signals DS, wherein the detection units 5 each generate one of the detection signals DS if the respective detection unit 5 detects one of the photons PH, an evaluation device 6 for evaluating the detection signals DS and for outputting coincidence signals KS, wherein the evaluation device 6 outputs one of the coincidence signals KS if a predeterminable coincidence depth is at least reached within a predeterminable coincidence time, wherein the coincidence depth indicates a number of those detection units that generate one of the detection signals DS within the respective coincidence time, a time measuring device 7 for measuring time periods ZS from emitting one of the laser pulses LP to outputting one of the coincidence signals KS by the evaluation device 6, and a control device 8 for controlling successive measurement operations MV, wherein one measurement value MW each is generated for one of the distances;

wherein, controlled by the control device 6, a plurality of measurement cycles MZ are performed during the measurement operation MV;

wherein, controlled by the control device 6, one of the laser pulses LP each is emitted with the pulse laser 2 at the beginning of the measurement cycles MZ;

wherein, controlled by the control device 6, one of the time periods ZS each is measured during the measurement cycles MZ by means of the time measuring device 7 for a plurality of coincidence signals KS that are detected during the respective measurement cycle MZ;

wherein, controlled by the control device 6, the time periods ZS measured during several measurement cycles MZ of one of the measurement operations MV by the time measuring device 7 are used to generate the measurement value MW of the respective measurement operation MV;

wherein, controlled by the control device 6, an adjustment of a maximum value MAX for an event number takes place, which corresponds to a number of time periods ZS that are used during one of the measurement cycles MZ to generate the measurement value MW of the respective measurement operation MV, wherein several time periods ZS measured previously by means of the time measuring device 7 are used for the adjustment; and wherein, controlled by the control device 6, after the adjustment of the maximum value MAX, the coincidence time is adjusted in dependence on the maximum value MAX and a measurement value of a background radiation determined by the control device 8.

In another aspect, the disclosure relates to a computer program for performing a method described herein when the same is executed on a computer or processor.

At the beginning of the "Start" measurement time window, the electronic time measuring device is started together with the emission of the laser pulse. The start address, which is used to select the memory block measurement histogram 9 or background histogram 10 for storing the laser event or background event time stamp, is set to one. As soon as the first event photon PH ("Event 1") is detected, the time period ZS (i.e. the current time value of the time measurement unit) is stored in the first memory element measurement histogram 9.1 or background histogram 10.1, depending on the measurement mode (laser or background). Subsequently, the histogram address is incremented by 1 to select the next memory block measurement histogram 9.2 or background histogram 10.2, so that the time period ZS of the next detected photon PH ("Event 2") is stored in the second measurement histogram 9.2 or in the second background histogram 10.2. If all memory blocks are occupied (i.e. the number of detected events corresponds to the number of available memory blocks, which is defined by the maximum value) or if the end of the measurement time window is reached, the measurement is terminated and the memory blocks measurement histogram 9 or background histogram 10 can be read out.

Analogous to the known method with only one detected event, 4 time stamps "Event 1" to "Event 4" of a pixel are stored across several measurement cycles MZ, in each case in the time interval ZI $T<2*d_{max}/c$ according to FIG. 11, in one of the measuring histograms 9.1 to 9.4 each, from which subsequently in each measuring histogram 9.1 to 9.4 the peak position of the laser signal is determined and converted into the distance. Before this, the respective background histogram 10.1 to 10.4 is subtracted from the associated measurement histogram 9.1 to 9.4 so that the quality evaluation of the SNR in the respective histogram is correct. The background histograms 10.1 to 10.4 can also be measured in the direct time-of-flight mode, since the detection of several photon events follows the Erlang distribution, the distribution density of which cannot be described analytically in a closed manner from the second detected photon PH ("Event 2"), whereby it is not possible, as in the first-photon method, to subtract the background distribution from the respective measurement histogram 9.1 to 9.4 by determining the background rate in the counting mode and an exponential fit (this should not be confused with the counting mode background measurement to determine the coincidence parameters). The quality criterion SNR>10 is used to check from which measurement histogram 9.1 to 9.4 the condition "Laser-peak>10×Residuum_Noise_Floor" is fulfilled, which basically takes place by comparing the histogram maximum value entry with the next-lower histogram maximum value. For example, if the quality criterion is currently already fulfilled from the third measurement histogram 9.3, the maximum value MAX is set to three from the previous value, which was four at initialization. This new maximum value MAX is now used such that a maximum of three time periods ZS are detected per measurement cycle MZ. In this case, the frame rate increases by 25%. Parallel to the quality evaluation, the current measurement value MWH of the background rate $\lambda_{\_BG}$ is determined by a background measurement in counting mode. Here, the measured background rate $\lambda_{\_BG}$ is in an interval [$\lambda_{\_total(k-1)}$, $\lambda_{\_total(k)}$], whose initial position and width is defined by the new maximum value MAX according to FIGS. 9 and 10. The new maximum value MAX and coincidence parameter are combined in a look-up table in the form of "$\lambda_{\_(KIT)\_(KIZ)\_(MAX)}$" and address a specific coincidence stage consisting of coincidence depth KIT and coincidence time KIZ. This parameter combination now determined for the new maximum value MAX and the current measurement value MWH of the background radiation is now used for a new measurement operation MV.

Figure 13:
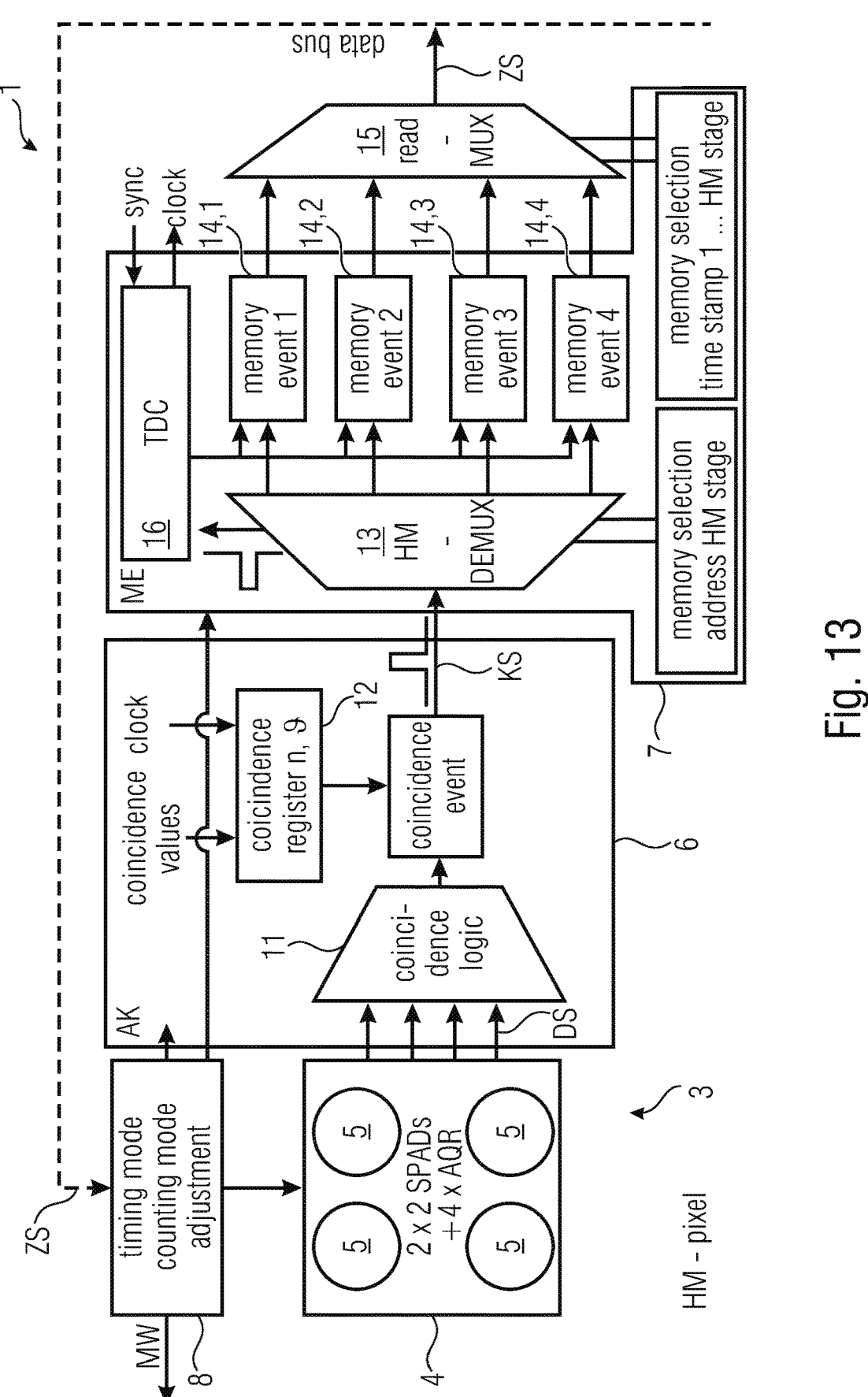
FIG. 13 is an embodiment of a laser measuring apparatus in a more detailed schematic block diagram.

FIG. 13 shows an embodiment of a laser measuring apparatus 1 in a more detailed schematic block diagram.

According to a further embodiment of the invention, the detection units 5 each comprise at least one single-photon avalanche diode.

The laser measuring apparatus 1 comprises a plurality of independent groups 4 of detection units 5, wherein each group 4, also called pixel, includes several detection units 5. The detection units 5 may be configured as SPADs in each case, since these are particularly suitable for detecting single photons PH due to their high sensitivity and thus for the method described. Each detection unit 5 of a group 4 provides detection signals DS as soon as an incident photon PH has been detected. From the detection signals DS of the detection units 5, a coincidence signal KS is generated within the group 4, which is supplied to the time measuring device 7, also called TDC. The time measuring device 7 measures the time periods ZS between an arbitrarily defined start time (e.g. emission of the laser pulse LP) and the occurrence of the subsequent coincidence signals KS. If the maximum value MAX of possible time periods ZS is reached, all following coincidence signals KS are discarded.

After the end of the measurement cycle MZ, all detected time periods ZS are read out and processed externally to determine the distance. The time measuring device 7 can be configured as a two-stage TDC. A counter, which counts at a fixed clock frequency, serves as the first stage and for coarse time measurement. To increase the temporal resolution, a second stage is used which interpolates the time between two clock edges of the primary clock signal. The interpolation can take place by delaying the clock signal in steps corresponding to $\frac{1}{16}$ of the clock period. The state of the 16 secondary clock signals generated in this way provides information about the temporal position between two clock edges of the primary clock. To detect several events within a cycle, the TDC can be operated as follows: At the start time (e.g. emission of the laser pulse), the time measuring device is started by the counter starting to count with the primary clock.

If a coincidence signal KS occurs, the value of the counter and of the 16 secondary clock signals existing at this time is stored in a memory 14.1 by means of a demultiplexer 13. The time measuring device 7, i.e. the counter, is not stopped in the process but continues to run until a defined end time. At the second occurrence of a coincidence signal KS, the now existing value of the counter and the secondary clock signals is again stored in a memory 14.2, which, however, does not correspond to the first memory 14.1. In this way, the times of all subsequent event detections are stored in separate memories 14.1 to 14.4. The maximum value MAX of the possible event detections within a measurement cycle MZ is limited in this realization by the number of memories 14. If all available memories 14 are occupied, the further event detections are discarded. After completion of one of the measurement cycles MZ, the stored time periods ZS can be transmitted to the control device 8 for evaluation via a multiplexer 15.

In addition to the above-mentioned embodiment of an integrated CMOS sensor, the presented method can also be realized in a distributed manner with discrete components and as a pure computer program. The method can also be used in 3D hybrid integration by means of wafer-to-wafer, chip-to-wafer or chip-to-chip bonding with associated read-out combinatorics and in different technologies such as CMOS or III-V semiconductors in different structure sizes. Further, the HM can also have a freely variable SNR threshold as a quality criterion. This can be varied depending on the scene conditions or higher-level system specifications. The determination of the coincidence stages and their switching thresholds can be specifically trained for certain application scenarios in combination with the quality criterion, e.g. by a neural network.

Figure 14:
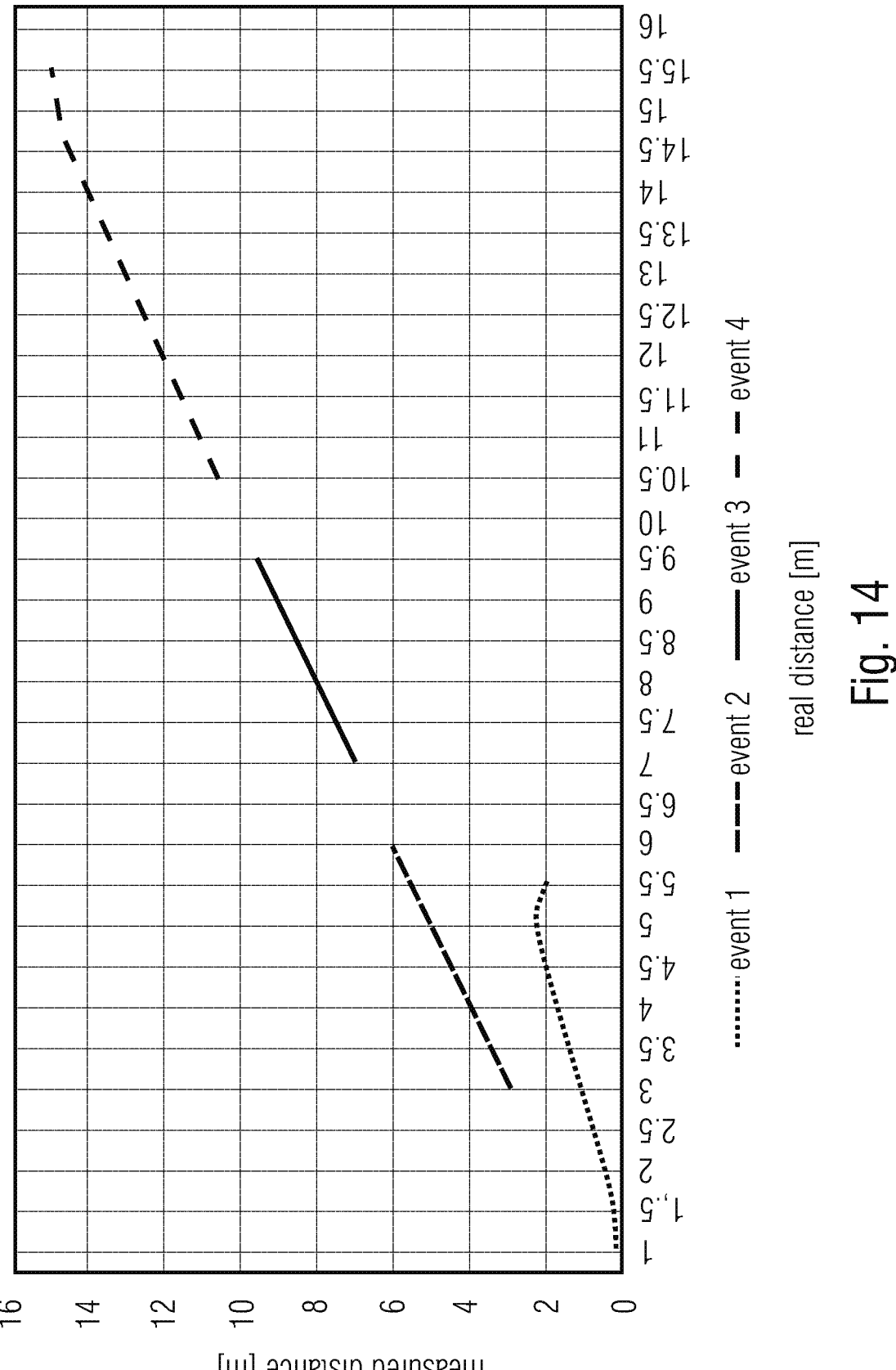
FIG. 14 is an exemplary range diagram for multi-event detection without adaptive coincidence at different maximum values.

FIG. 14 shows an exemplary range diagram for multi-event detection without adaptive coincidence at different maximum values. To illustrate the improvement generated by the method compared to conventional technology, simulation of the distance measurement is performed for different maximum values MAX. Using Matlab simulation software, the hierarchy model was considered for various combinations, which are discussed below. For the simulations, typical system parameters of a flash LiDAR sensor were used as a basis and a background light of 50 klx was adjusted, which corresponds to a background rate of $\lambda_{\_BG}$=50 MHz under the simulation parameters given here.

This results in a realistic evaluation of the quality criterion, since events 3 and 4 are now also visible and higher coincidence depths and lower coincidence times are also achieved. In this simulation, the distance is determined by a highly accurate quantile filtering (instead of a simple averaging) of the background-compensated event histogram that fulfills the threshold condition according to the previous explanations.

In FIG. 14, the linear sub-areas of the depth map covered by the respective maximum value MAX (event level) are recognizable for the use of multi-event without adaptive coincidence. To the left of the respective linear range, the respective curve would run horizontally because the event stage has not yet been activated for detection. To the right of it, only background would be detected, and the next higher event stage would follow with its linear range.

Figure 15:
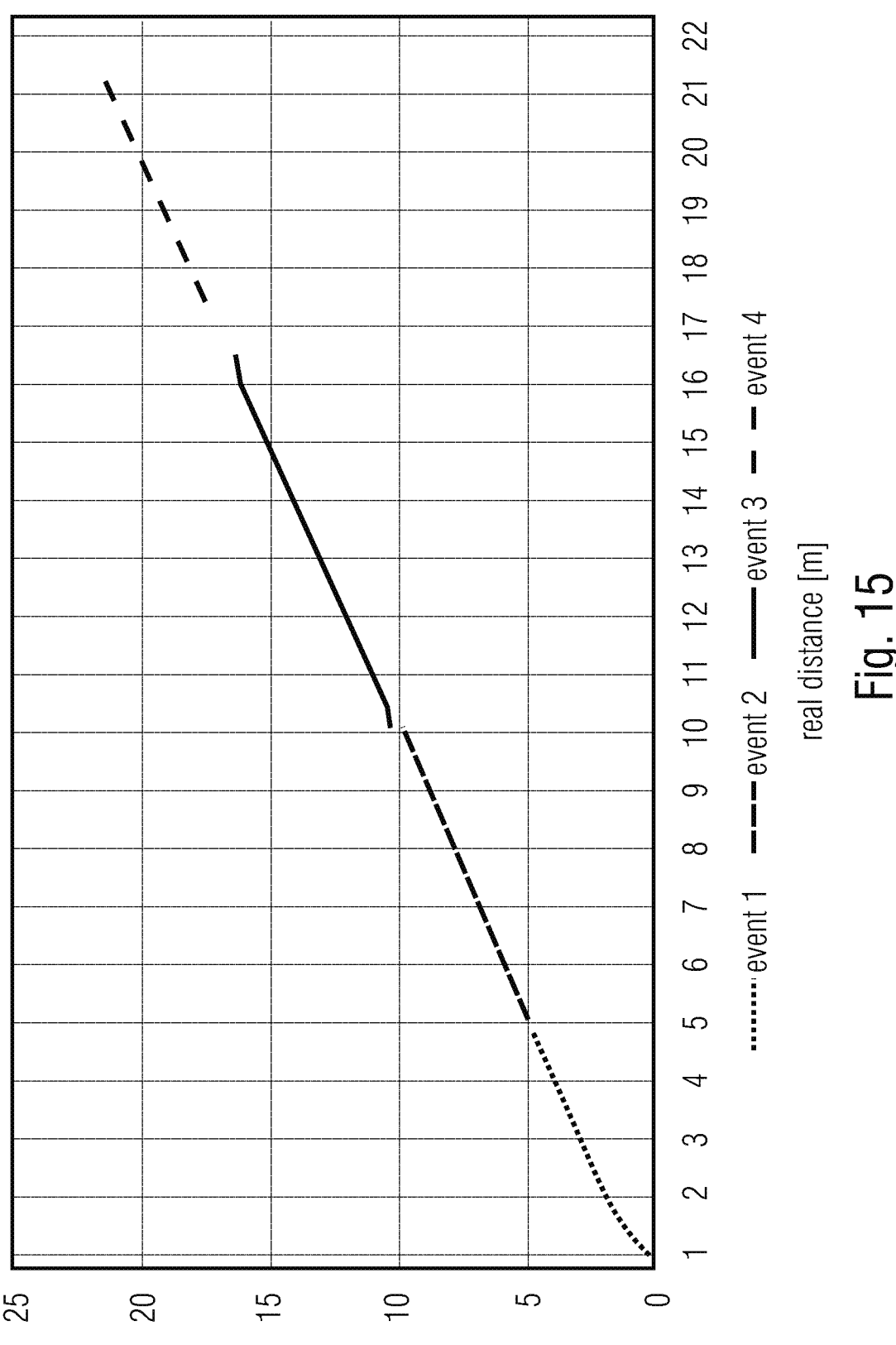
FIG. 15 is an exemplary range diagram for multi-event detection with adaptive coincidence at different maximum values.

FIG. 15 shows an exemplary range diagram for multi-event detection with adaptive coincidence at different maximum values. If adaptive coincidence is activated, the range curves shown in FIG. 15 are obtained. The gain in range from 16 m to approx. 22 m corresponding to 37% and the overlap of the distance curves for multi-event 1 and 2 are clearly visible. The set of curves shown herein only shows a control state according to FIG. 12 from a large number of possible combinations of maximum value MAX, coincidence depth KIT and coincidence time KIZ. Nevertheless, FIG. 15 clearly shows the superiority of the proposed method.

Depending on certain implementation requirements, embodiments of the invention can be implemented at least partly in hardware and/or at least partly in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that one or several or all functional elements of the inventive apparatus are realized.

In some embodiments, a programmable logic device (for example a field programmable gate array, FPGA) may be used to perform some or all of the functionalities of the apparatus described herein. In some embodiments, a field programmable gate array may cooperate with a micropro- cessor in order to realize one of the apparatuses described herein.

Depending on certain implementation requirements, embodiments of the inventive method can be performed by means of an apparatus that is implemented at least partly in hardware and/or at least partly in software. The implemen- tation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the inventive method is performed.

Aspects of the invention described herein in the context of the inventive apparatus also represent aspects of the inven- tive method. Vice versa, aspects of the invention described herein in the context of the inventive method also represent aspects of the inventive apparatus.

Generally, the methods in some embodiments are per- formed by any hardware apparatus. This can be a universally applicable hardware, such as a computer processor (CPU) or hardware specific for the method, such as ASIC.

A further embodiment comprises a computer having installed thereon the computer program for performing one of the methods described herein.

Generally, embodiments of the present invention can be implemented as a computer program product with a program code, the program code being operative for performing one of the methods when the computer program product runs on a computer. The program code may be stored, for example, on a machine-readable carrier.

Some embodiments of the invention include a non-vola- tile data carrier or data memory comprising a computer program with electronically readable control signals capable of cooperating with a programmable computer system such that one of the methods described herein is performed.

Embodiments of the present invention may be imple- mented as a computer program product comprising a com- puter program, the computer program being operative to perform any of the methods when the computer program runs on a computer.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Peter Seitz and Albert J. P. Theuwissen (editors), "Single-Photon Imaging". Heidelberg; New York: Springer, 2011.
[2] Maik Beer, Bedrich J. Hosticka, and Rainer Kokozin- ski, "SPAD-Based 3D Sensors for High Ambient Illu- mination." 2016 12th Conference on Ph.D. Research in Microelectronics and Electronics (PRIME), 2016, pp. 1-4.
[3] Tarek A. Abbas, Neale A. W. Dutton, Oscar Almer, Neil Finlayson, Francescopaolo Mattioli Della Rocca, and Robert Henderson, "A CMOS SPAD Sensor With a Multi-Event Folded Flash Time-to-Digital Converter for Ultra-Fast Optical Transient Capture." IEEE Sen- sors Journal, vol. 18, no. 8, pp. 3163-3173, April 2018.
[4] DE 10 2017 202 353 A1
[5] DE 10 2019 202 459 A1

The invention claimed is:

1. Laser measuring apparatus for measuring distances, comprising
a pulse laser for emitting laser pulses;
a photon detection device with a group of detection units for detecting photons and for generating detection signals, wherein each of the detection units generates one of the detection signals if the respective detection unit detects one of the photons;
an evaluation device for evaluating the detection signals and for outputting coincidence signals, wherein the evaluation device outputs one of the coincidence sig- nals if a predeterminable coincidence depth is at least reached within a predeterminable coincidence time, wherein the coincidence depth indicates a number of those detection units that generate one of the detection signals within the respective coincidence time;
a time measuring device for measuring time periods from emitting one of the laser pulses to outputting one of the coincidence signals by the evaluation device; and
a control device for controlling successive measurement operations, wherein at each of the measurement opera- tions a measurement value is generated for one of the distances, wherein the control device is configured such
that a plurality of measurement cycles is performed during each of the measurement operations;
that one of the laser pulses is emitted with the pulse laser at the beginning of each measurement cycle of the plurality of measurement cycles;
that, by means of the time measuring device, during each measurement cycle of the plurality of measurement cycles one of the time periods is measured for each of the coincidence signals being detected during the respective measurement cycle;
that the time periods measured during several of the measurement cycles of one of the measurement opera- tions by means of the time measuring device are used to generate the measurement value of the respective measurement operation;
that an adjustment of a maximum value for an event number takes place that corresponds to the number of time periods that are used during one of the measure- ment cycles to generate the measurement value of the respective measurement operation, wherein several of the time periods measured previously by means of the time measuring device are used for the adjustment; and that after the adjustment of the maximum value, the coincidence time is adjusted in dependence on the maximum value and a measurement value of a background radiation determined by the control device.

2. Laser measuring apparatus according to claim 1, wherein the control device is configured such that the coincidence time is adjusted based on a table stored in the control device.

3. Laser measuring apparatus according to claim 1, wherein the control device is configured such that after the adjustment of the maximum value, the coincidence depth is adjusted in dependence on the maximum value and the measurement value of the background radiation.

4. Laser measuring apparatus according to claim 1, wherein the control device is configured such that the coincidence time and/or the coincidence depth are adjusted based on a table stored in the control device.

5. Laser measuring apparatus according to claim 1, wherein the control device is configured such that, for determining the measurement value of the background radiation, the coincidence depth is set to a value n=1 and the maximum value to a value $N_{PH}=1$.

6. Laser measuring apparatus according to claim 1, wherein the control device is configured such that the adjustment of the maximum value takes place after a completion of the measurement cycles of one of the measurement operations, wherein the time periods measured during the measurement cycles of the respective measurement operation are used to adjust the maximum value and to generate the measurement value of the respective measurement operation.

7. Laser measuring apparatus according to claim 1, wherein the control device is configured to detect of signal-to-noise ratios for different values of the maximum value and to adjust the maximum value such that the maximum value assumes a smallest possible value where a signal-to-noise ratio of the laser measurement device exceeds a threshold.

8. Laser measuring apparatus according to claim 1, wherein the control device is configured such that those of the coincidence signals, that are generated during the measurement cycles of one of the measurement operations until a time interval, that corresponds to a maximum range of the laser measuring apparatus, expires, are stored in several measurement histograms, wherein for each of different values of the maximum value one of the measurement histograms is generated; and that those of the coincidence signals, that are generated during the measurement cycles of the one of the measurement operations after the time interval has expired, are stored in several background histograms, wherein for each of the different values of the maximum value one of the background histograms is generated;

wherein the detection of the signal-to-noise ratios for the different values of the maximum value takes place based on the measurement histograms and the background histograms.

9. Laser measuring apparatus according to claim 1, wherein each of the detection units comprises at least one single-photon avalanche diode.

10. Method for operating a laser measuring apparatus for measuring distances, wherein the laser measuring apparatus comprises:

a pulse laser for emitting laser pulses, a photon detection device with a group of detection units for detecting photons and for generating detection signals, wherein each of the detection units generates one of the detection signals if the respective detection unit detects one of the photons;

an evaluation device for evaluating the detection signals and for outputting coincidence signals, wherein the evaluation device outputs one of the coincidence signals if a predeterminable coincidence depth is at least reached within a predeterminable coincidence time, wherein the coincidence depth indicates a number of those detection units that generate one of the detection signals within the respective coincidence time;

a time measuring device for measuring time periods from emitting one of the laser pulses to outputting one of the coincidence signals by the evaluation device; and a control device for controlling successive measurement operations, wherein at each of the measurement operations a measurement value is generated for one of the distances, wherein, controlled by the control device, a plurality of measurement cycles is performed during each of the measurement operations;

wherein, controlled by the control device, one of the laser pulses each is emitted with the pulse laser at a beginning of each measurement cycle of the plurality of measurement cycles;

wherein, controlled by the control device, by means of the time measuring device, during each measurement cycle of the plurality of measurement cycles one of the time periods is measured for each of the coincidence signals being detected during the respective measurement cycle;

wherein, controlled by the control device, the time periods measured during several measurement cycles of one of the measurement operations by means of the time measuring device are used to generate the measurement value of the respective measurement operation;

wherein, controlled by the control device, an adjustment of a maximum value for an event number takes place, which corresponds to a number of time periods that are used during one of the measurement cycles to generate the measurement value of the respective measurement operation, wherein several of the time periods measured previously by means of the time measuring device are used for the adjustment; and wherein, controlled by the control device, after the adjustment of the maximum value, the coincidence time is adjusted in dependence on the maximum value and a measurement value of a background radiation determined by the control device.

11. A computer-readable storage medium containing executable instructions that, when executed by a processor, perform the steps of the method of claim 10.

* * * * *